US012103830B2

(12) United States Patent
Yutzy et al.

(10) Patent No.: US 12,103,830 B2
(45) Date of Patent: Oct. 1, 2024

(54) SYSTEMS AND METHODS FOR RESTRICTING OPERATION OF A LIFT DEVICE

(71) Applicant: Oshkosh Corporation, Oshkosh, WI (US)

(72) Inventors: Fredric Yutzy, Oshkosh, WI (US); Brian Mohlman, Oshkosh, WI (US); Nicholas Minnick, Oshkosh, WI (US); Korry Kobel, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/492,735

(22) Filed: Oct. 23, 2023

(65) Prior Publication Data

US 2024/0051807 A1 Feb. 15, 2024

Related U.S. Application Data

(63) Continuation of application No. 16/576,286, filed on Sep. 19, 2019, now Pat. No. 11,840,433.

(Continued)

(51) Int. Cl.
*B66F 17/00* (2006.01)
*B66F 11/04* (2006.01)

(52) U.S. Cl.
CPC .......... *B66F 17/006* (2013.01); *B66F 11/042* (2013.01)

(58) Field of Classification Search
CPC ............................. B66F 17/006; B66F 11/042
See application file for complete search history.

(56) References Cited

U.S. PATENT DOCUMENTS 6,578,694 B2 6/2003 Harris et al.
6,609,603 B2 8/2003 Cole (Continued)

FOREIGN PATENT DOCUMENTS

EP 3173369 A1 * 5/2017 .............. B66F 11/04
EP 3 339 240 A1 6/2018
GB 2 553 137 A 2/2018

OTHER PUBLICATIONS

Foreign Action other than Search Report on PCT PCT/US2019/051947 Dtd Apr. 1, 2021.

(Continued)

*Primary Examiner* — Charles J Han
(74) *Attorney, Agent, or Firm* — Foley & Lardner LLP

(57) ABSTRACT

A lift device includes a chassis, tractive elements, a platform, a lift assembly, a first set of proximity sensors, and a controller. The tractive elements are rotatably coupled to the chassis and support the chassis. The platform is disposed above the chassis and includes a deck for supporting an operator. The lift assembly couples the platform to the chassis and can selectably move the platform between a lowered position and a raised position. The first set of proximity sensors are coupled to the platform and detect a distance of an obstacle relative to the platform. The controller is operably coupled with an alert system and receives obstacle detection data from the first set of proximity sensors. The controller selects a subset of the first set of proximity sensors to analyze based on an active function of the lift device and determines whether the obstacle is within the minimum allowable distance.

20 Claims, 13 Drawing Sheets

Related U.S. Application Data

(60) Provisional application No. 62/819,226, filed on Mar. 15, 2019, provisional application No. 62/734,192, filed on Sep. 20, 2018.

(56) References Cited

U.S. PATENT DOCUMENTS

| | | | | |
|---|---|---|---|---|
| 6,799,934 | B1 | 10/2004 | Bartlett | |
| 7,108,473 | B2 | 9/2006 | Bartlett | |
| 7,578,379 | B2 | 8/2009 | Gillmore et al. | |
| 7,648,015 | B2 | 1/2010 | Gillmore et al. | |
| 8,051,970 | B2 | 11/2011 | Shaber et al. | |
| 2005/0187712 | A1* | 8/2005 | Callaghan ............. | B66B 5/0031 701/301 |
| 2017/0131716 | A1 | 5/2017 | Brekke et al. | |
| 2018/0057333 | A1 | 3/2018 | Gale et al. | |

OTHER PUBLICATIONS

Foreign Search Report on PCT PCT/US2019/051947 Dtd Jan. 10, 2020.

* cited by examiner

SYSTEMS AND METHODS FOR RESTRICTING OPERATION OF A LIFT DEVICE

CROSS-REFERENCE TO RELATED APPLICATION

The present application is a continuation of U.S. application Ser. No. 16/576,286, filed Sep. 19, 2019, which claims the benefit of U.S. Provisional Patent Application No. 62/819,226, filed on Mar. 15, 2019, and U.S. Provisional Patent Application No. 62/734,192, filed on Sep. 20, 2018, both of which are incorporated herein by reference in their entireties.

BACKGROUND

Certain aerial work platforms, known as scissor lifts, incorporate a frame assembly that supports a platform. The platform is coupled to the frame assembly using a system of linked supports arranged in a crossed pattern, forming a scissor assembly. As the supports rotate relative to one another, the scissor assembly extends or retracts, raising or lowering the platform relative to the frame. Accordingly, the platform moves primarily or entirely vertically relative to the frame assembly. Scissor lifts are commonly used where scaffolding or a ladder might be used, as they provide a relatively large platform from which to work that can be quickly and easily adjusted to a broad range of heights. Scissor lifts are commonly used for painting, construction projects, accessing high shelves, changing lights, and maintaining equipment located above the ground.

SUMMARY

One implementation of the present disclosure is a lift device, according to an exemplary embodiment. The lift device includes a chassis, tractive elements, a platform, a lift assembly, a first set of proximity sensors, and a controller. The tractive elements are rotatably coupled to the chassis and are configured to support the chassis. The platform is disposed above the chassis and includes a deck that extends in a substantially horizontal plane and defines a top surface configured to support an operator. The lift assembly couples the platform to the chassis and is configured to selectably move the platform between a lowered position and a raised position above the lowered position. The first set of proximity sensors are coupled to the platform and are configured to detect a distance of an obstacle relative to a portion of the platform and provide obstacle detection data. The controller is operably coupled with an alert system and configured to receive the obstacle detection data from the first set of proximity sensors. The controller is configured to provide an alert indication to the alert system in response to determining that the obstacle is within a minimum allowable distance from the lift device. The controller is configured to (a) select a subset of the first set of proximity sensors to analyze based on an active function of the lift device and (b) determine whether the obstacle is within the minimum allowable distance from the lift device based on the obstacle detection data from the subset of the first set of proximity sensors.

Another implementation of the present disclosure is a method for providing an alert for a lift device and restricting operation of the lift device, according to an exemplary embodiment. The method includes receiving object detection data from one or more proximity sensors. The method includes determining multiple sensor limit values based on machine function information of the lift device. The method includes determining if an obstacle is present in a stop zone or a warning zone using the received object detection data. The method includes restricting one or more operations of a lift assembly of the lift device and the lift device in response to determining that the obstacle is present in the stop zone. The method includes operating an alert system to provide at least one of a visual and an aural alert in response to determining that the obstacle is present in the warning zone.

Another implementation of the present disclosure is an obstacle detection system for a lift device, according to an exemplary embodiment. The obstacle detection system includes a first set of proximity sensors coupled to a platform of the lift device and oriented at least partially in a downwards direction. The obstacle detection system includes a second set of proximity sensors coupled to the platform. One or more of the second set of proximity sensors are oriented along a longitudinal axis of the platform or in a direction at least partially upwards. The obstacle detection system includes a controller operably coupled with an alert system. The controller is configured to receive obstacle detection data from the first set of proximity sensors and the second set of proximity sensors. The controller is also configured to determine a position of an obstacle relative to the lift device. The controller is also configured to determine if the obstacle is within a warning zone or a stop zone. The controller is also configured to operate the alert system to provide at least one of a visual alert and an aural alert in response to determining that the obstacle is within the warning zone. The controller is configured to restrict one or more operations of the lift device in response to determining that the obstacle is within the stop zone.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a lift device is shown, according to various exemplary embodiment. The lift device includes a frame assembly, a lifting assembly, and a platform. The platform includes various proximity sensors disposed about the platform and configured to detect obstacles, objects, obstructions, etc., in areas around the platform (e.g., above the platform, to the sides of the platform, in front of the platform, behind the platform, below the platform, etc.). The proximity sensors may be any sensors configured to measure a relative distance to an object or a proximity sensor configured to determine a relative location of the object. The proximity sensors provide object detection data to a controller. The controller uses the object detection data to determine if an alarm/alert should be provided to the operator of the lift device. The alert may be any of a visual alert and an aural alert. The controller can be configured to differentiate between objects in a warning zone and a stop zone. If objects are detected in the stop zone, or near the stop zone, the controller can restrict one or more operations of the lift device (e.g., extension of the platform). The controller can adjust the areas of the warning zones and/or the stop zones based on a distance between the platform and a ground surface. Advantageously, the controller prevents objects or obstacles from coming too close to the lift device, the platform, and the lift assembly.

Lift Device

Figure 1:
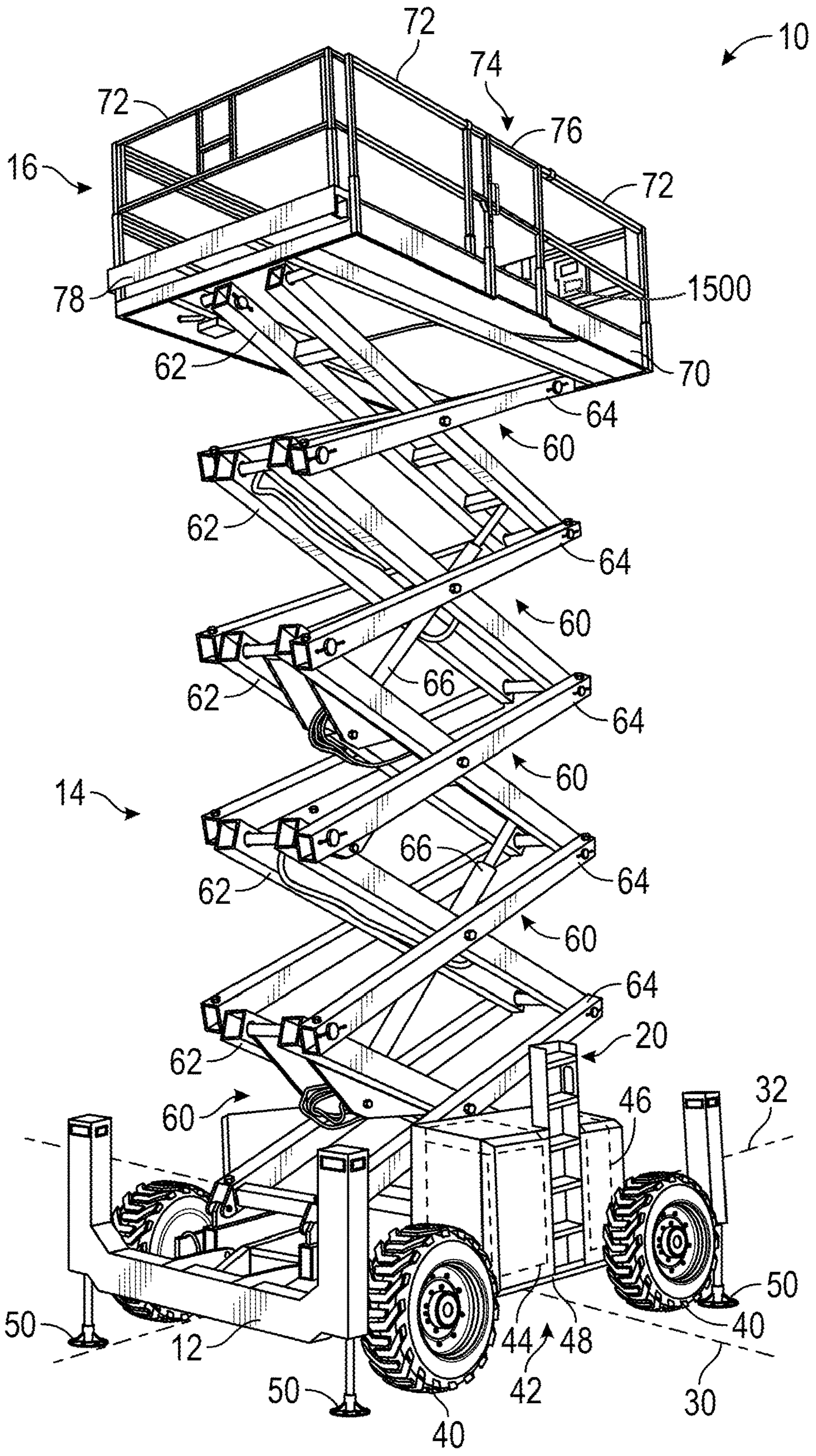
FIG. 1 is a perspective view of a lift device, according to an exemplary embodiment.

According to the exemplary embodiment shown in FIG. 1, a lift device (e.g., a scissor lift, an aerial work platform, a boom lift, a telehandler, etc.), shown as lift device 10, includes a chassis, shown as frame assembly 12. A lift device (e.g., a scissor assembly, a boom assembly, etc.), shown as lift assembly 14, couples the frame assembly 12 to a platform, shown as platform 16. The frame assembly 12 supports the lift assembly 14 and the platform 16, both of which are disposed directly above the frame assembly 12. In use, the lift assembly 14 extends and retracts to raise and lower the platform 16 relative to the frame assembly 12 between a lowered position and a raised position. The lift device 10 includes an access assembly, shown as an access assembly 20, that is coupled to the frame assembly 12 and configured to facilitate access to the platform 16 from the ground by an operator when the platform 16 is in the lowered position.

Referring again to FIG. 1, the frame assembly 12 defines a horizontal plane having a lateral axis 30 and a longitudinal axis 32. In some embodiments, the frame assembly 12 is rectangular, defining lateral sides extending parallel to the lateral axis 30 and longitudinal sides extending parallel to the longitudinal axis 32. In some embodiments, the frame assembly 12 is longer in a longitudinal direction than in a lateral direction. In some embodiments, the lift device 10 is configured to be stationary or semi-permanent (e.g., a system that is installed in one location at a work site for the duration of a construction project). In such embodiments, the frame assembly 12 may be configured to rest directly on the ground and/or the lift device 10 may not provide powered movement across the ground. In other embodiments, the lift device 10 is configured to be moved frequently (e.g., to work on different tasks, to continue the same task in multiple locations, to travel across a job site, etc.). Such embodiments may include systems that provide powered movement across the ground.

Referring to FIG. 1, the lift device 10 is supported by a plurality of tractive assemblies 40, each including a tractive element (e.g., a tire, a track, etc.), that are rotatably coupled to the frame assembly 12. The tractive assemblies 40 may be powered or unpowered. As shown in FIG. 1, the tractive assemblies 40 are configured to provide powered motion in the direction of the longitudinal axis 32. One or more of the tractive assemblies 40 may be turnable to steer the lift device 10. In some embodiments, the lift device 10 includes a powertrain system 42. In some embodiments, the powertrain system 42 includes a primary driver 44 (e.g., an engine). A transmission may receive the mechanical energy and provide an output to one or more of the tractive assemblies 40. In some embodiments, the powertrain system 42 includes a pump 46 configured to receive mechanical energy from the primary driver 44 and output a pressurized flow of hydraulic fluid. The pump 46 may supply mechanical energy (e.g., through a pressurized flow of hydraulic fluid) to individual motive drivers (e.g., hydraulic motors) configured to facilitate independently driving each of the tractive assemblies 40. In other embodiments, the powertrain system 42 includes an energy storage device (e.g., a battery, capacitors, ultra-capacitors, etc.) and/or is electrically coupled to an outside source of electrical energy (e.g., a standard power outlet). In some such embodiments, one or more of the tractive assemblies 40 include an individual motive driver (e.g., a motor that is electrically coupled to the energy storage device, etc.) configured to facilitate independently driving each of the tractive assemblies 40. The outside source of electrical energy may charge the energy storage device or power the motive drivers directly. The powertrain system 42 may additionally or alternatively provide mechanical energy (e.g., using the pump 46, by supplying electrical energy, etc.) to one or more actuators of the lift device 10 (e.g., the leveling actuators 50, the lift actuators 66, the stair actuator 230, etc.). One or more components of the powertrain system 42 may be housed in an enclosure, shown as housing 48. The housing 48 is coupled to the frame assembly 12 and extends from a side of the lift device 10

(e.g., a left or right side). The housing 48 may include one or more doors to facilitate access to components of the powertrain system 42.

In some embodiments, the frame assembly 12 is coupled to one or more actuators, shown in FIG. 1 as leveling actuators 50. The lift device 10 includes four leveling actuators 50, one in each corner of the frame assembly 12. The leveling actuators 50 extend and retract vertically between a stored position and a deployed position. In the stored position, the leveling actuators 50 are raised and do not contact the ground. In the deployed position, the leveling actuators 50 contact the ground, lifting the frame assembly 12. The length of each of the leveling actuators 50 in their respective deployed positions may be varied to adjust the pitch (i.e., rotational position about the lateral axis 30) and the roll (i.e., rotational position about the longitudinal axis 32) of the frame assembly 12. Accordingly, the lengths of the leveling actuators 50 in their respective deployed positions may be adjusted such that the frame assembly 12 is leveled with respect to the direction of gravity, even on uneven or sloped terrains. The leveling actuators 50 may additionally lift the tractive elements of the tractive assemblies 40 off the ground, preventing inadvertent driving of the lift device 10.

Referring to FIG. 1, the lift assembly 14 includes a number of subassemblies, shown as scissor layers 60, each including a first member, shown as inner member 62, and a second member, shown as outer member 64. In each scissor layer 60, the outer member 64 receives the inner member 62. The inner member 62 is pivotally coupled to the outer member 64 near the centers of both the inner member 62 and the outer member 64. Accordingly, inner member 62 pivots relative to the outer member 64 about a lateral axis. The scissor layers 60 are stacked atop one another to form the lift assembly 14. Each inner member 62 and each outer member 64 has a top end and a bottom end. The bottom end of each inner member 62 is pivotally coupled to the top end of the outer member 64 immediately below it, and the bottom end of each outer member 64 is pivotally coupled to the top end of the inner member 62 immediately below it. Accordingly, each of the scissor layers 60 are coupled to one another such that movement of one scissor layer 60 causes a similar movement in all of the other scissor layers 60. The bottom ends of the inner member 62 and the outer member 64 belonging to the lowermost of the scissor layers 60 are coupled to the frame assembly 12. The top ends of the inner member 62 and the outer member 64 belonging to the uppermost of the scissor layers 60 are coupled to the platform 16. The inner members 62 and/or the outer members 64 are slidably coupled to the frame assembly 12 and the platform 16 to facilitate the movement of the lift assembly 14. Scissor layers 60 may be added to or removed from the lift assembly 14 to increase or decrease, respectively, the maximum height that the platform 16 is configured to reach.

One or more actuators (e.g., hydraulic cylinders, pneumatic cylinders, motor-driven leadscrews, etc.), shown as lift actuators 66, are configured to extend and retract the lift assembly 14. As shown in FIG. 1, the lift assembly 14 includes a pair of lift actuators 66. Lift actuators 66 are pivotally coupled to an inner member 62 at one end and pivotally coupled to another inner member 62 at the opposite end. These inner members 62 belong to a first scissor layer 60 and a second scissor layer 60 that are separated by a third scissor layer 60. In other embodiments, the lift assembly 14 includes more or fewer lift actuators 66 and/or the lift actuators 66 are otherwise arranged. The lift actuators 66 are configured to actuate the lift assembly 14 to selectively reposition the platform 16 between the lowered position, where the platform 16 is proximate the frame assembly 12, and the raised position, where the platform 16 is at an elevated height. In some embodiments, extension of the lift actuators 66 moves the platform 16 vertically upward (extending the lift assembly 14), and retraction of the linear actuators moves the platform 16 vertically downward (retracting the lift assembly 14). In other embodiments, extension of the lift actuators 66 retracts the lift assembly 14, and retraction of the lift actuators 66 extends the lift assembly 14. In some embodiments, the outer members 64 are approximately parallel and/or contacting one another when with the lift assembly 14 in a stored position. The lift device 10 may include various components to drive the lift actuators 66 (e.g., pumps, valves, compressors, motors, batteries, voltage regulators, etc.).

Referring again to FIG. 1, the platform 16 includes a support surface, shown as deck 70, defining a top surface configured to support operators and/or equipment and a bottom surface opposite the top surface. The bottom surface and/or the top surface extend in a substantially horizontal plane. A thickness of the deck 70 is defined between the top surface and the bottom surface. The bottom surface is coupled to a top end of the lift assembly 14. In some embodiments, the deck 70 is rectangular. In some embodiments, the deck 70 has a footprint that is substantially similar to that of the frame assembly 12.

Referring again to FIG. 1, a number of guards or railings, shown as guard rails 72, extend upwards from the deck 70. The guard rails 72 extend around an outer perimeter of the deck 70, partially or fully enclosing a supported area on the top surface of the deck 70 that is configured to support operators and/or equipment. The guard rails 72 provide a stable support for the operators to hold and facilitate containing the operators and equipment within the supported area. The guard rails 72 define one or more openings 74 through which the operators can access the deck 70. The opening 74 may be a space between two guard rails 72 along the perimeter of the deck 70, such that the guard rails 72 do not extend over the opening 74. Alternatively, the opening 74 may be defined in a guard rail 72 such that the guard rail 72 extends across the top of the opening 74. In some embodiments, the platform 16 includes a door 76 that selectively extends across the opening 74 to prevent movement through the opening 74. The door 76 may rotate (e.g., about a vertical axis, about a horizontal axis, etc.) or translate between a closed position, shown in FIG. 1, and an open position. In the closed position, the door 76 prevents movement through the opening 74. In the open position, the door 76 facilitates movement through the opening 74.

Referring again to the embodiments of FIG. 1, the platform 16 further includes one or more platforms, shown as extendable decks 78, that are received by the deck 70 and that each define a top surface. The extendable decks 78 are selectively slidable relative to the deck 70 between an extended position and a retracted position. In the retracted position, shown in FIG. 1, the extendable decks 78 are completely or almost completely received by the deck 70. In the extended position, the extendable decks 78 project outward (e.g., longitudinally, laterally, etc.) relative to the deck 70 such that their top surfaces are exposed. With the extendable decks 78 projected, the top surfaces of the extendable decks 78 and the top surface of the deck 70 are all configured to support operators and/or equipment, expanding the supported area. In some embodiments, the extendable decks 78 include guard rails partially or fully enclose the supported area. The extendable decks 78 facilitate accessing areas that are spaced outward from the frame assembly 12.

Referring to FIG. 1, the access assembly 20 is coupled to a longitudinal side of the frame assembly 12. As shown in FIG. 1, the access assembly 20 is a ladder assembly extending along a longitudinal side of the frame assembly 12. The access assembly 20 is aligned with the door 76 such that, when the platform 16 is in the lowered position, the access assembly 20 facilitates access to the upper surface of the platform 16 through the opening 74.

Object/Obstacle Detection System

Figure 3:
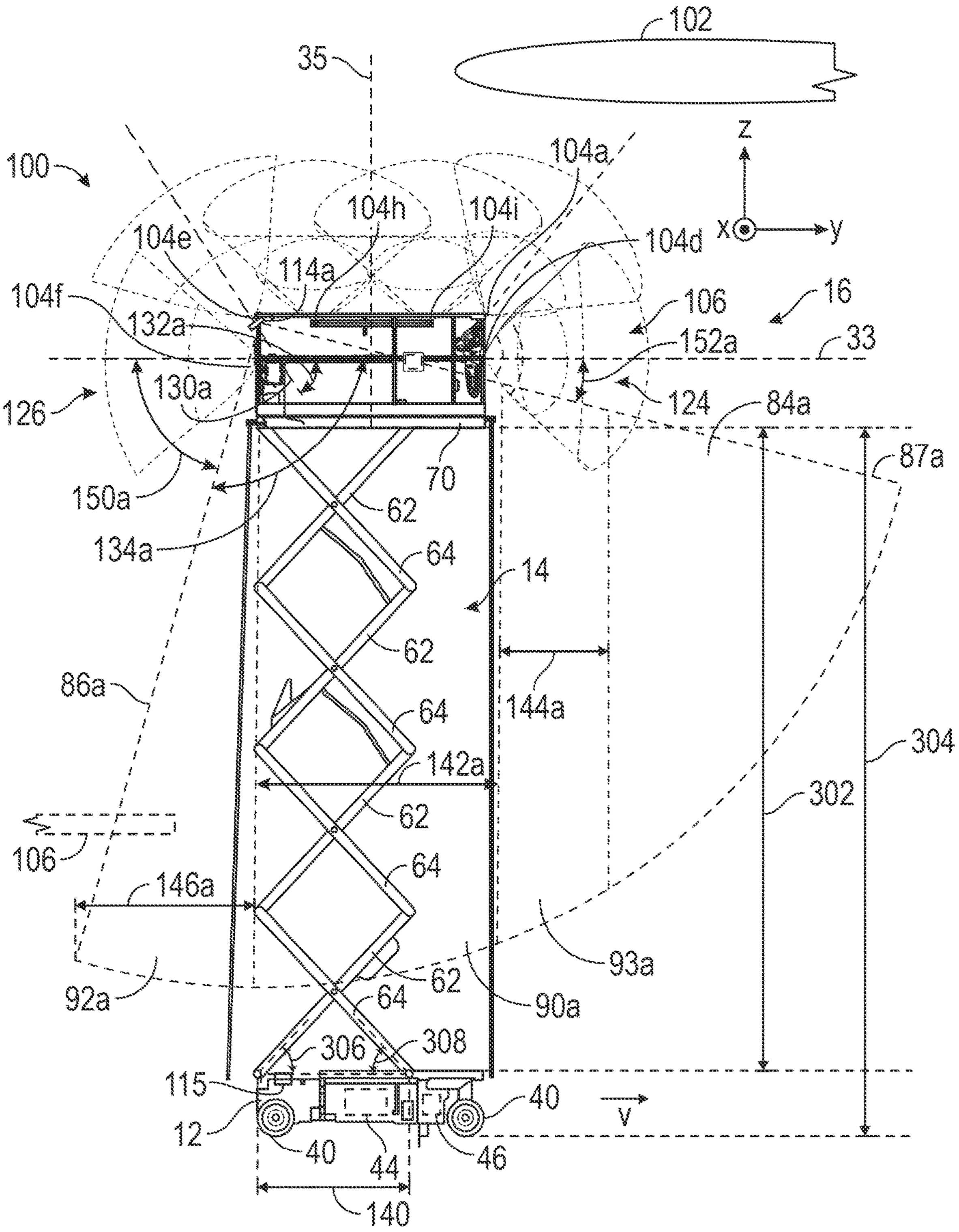
FIG. 3 is a side view of the lift device of FIG. 1, showing scan areas of one or more of the proximity sensors of FIG. 2, according to an exemplary embodiment.
Figure 5:
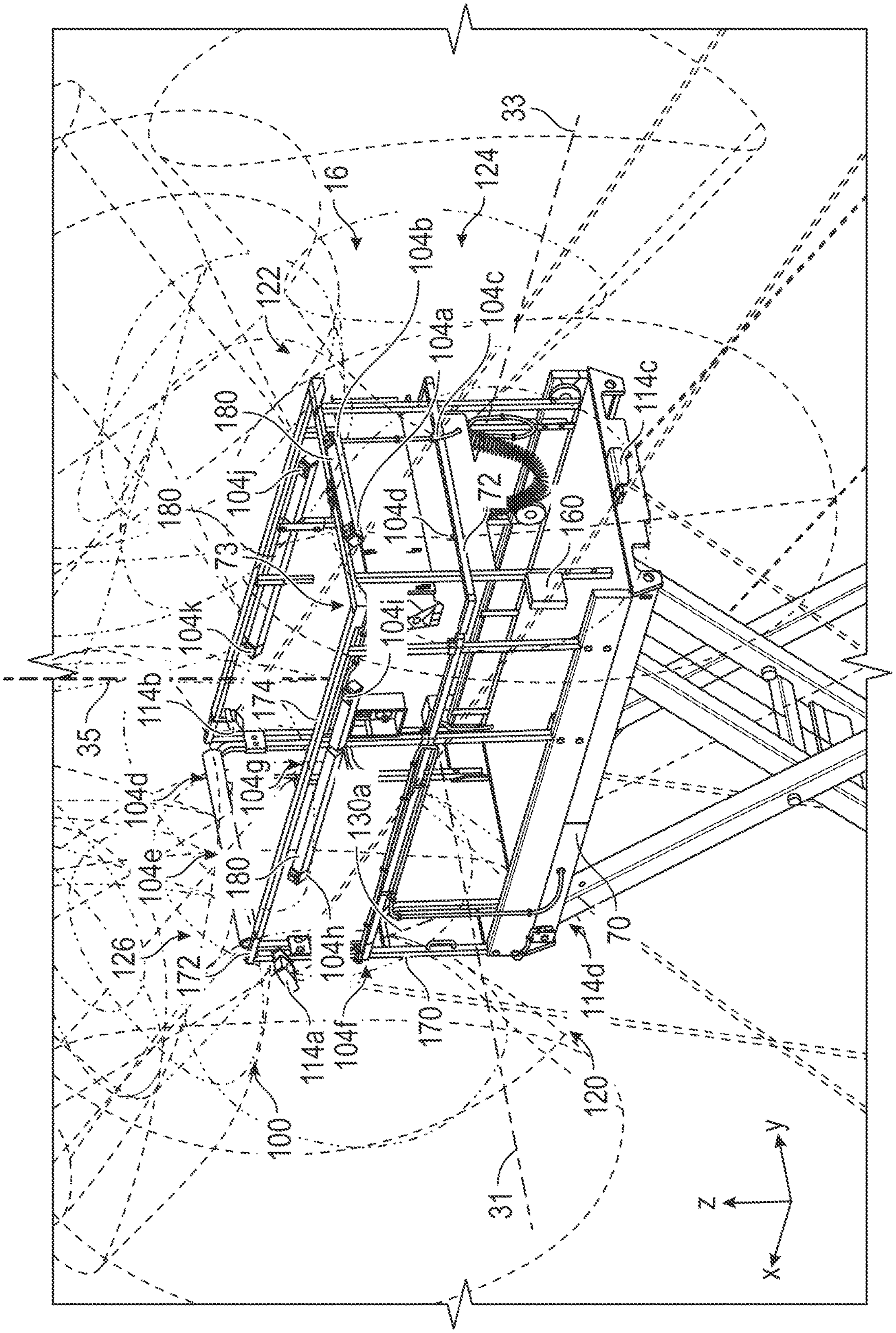
FIG. 5 is a perspective view of a platform of the lift device of FIG. 1, including various proximity sensors, according to an exemplary embodiment.
Figure 6:
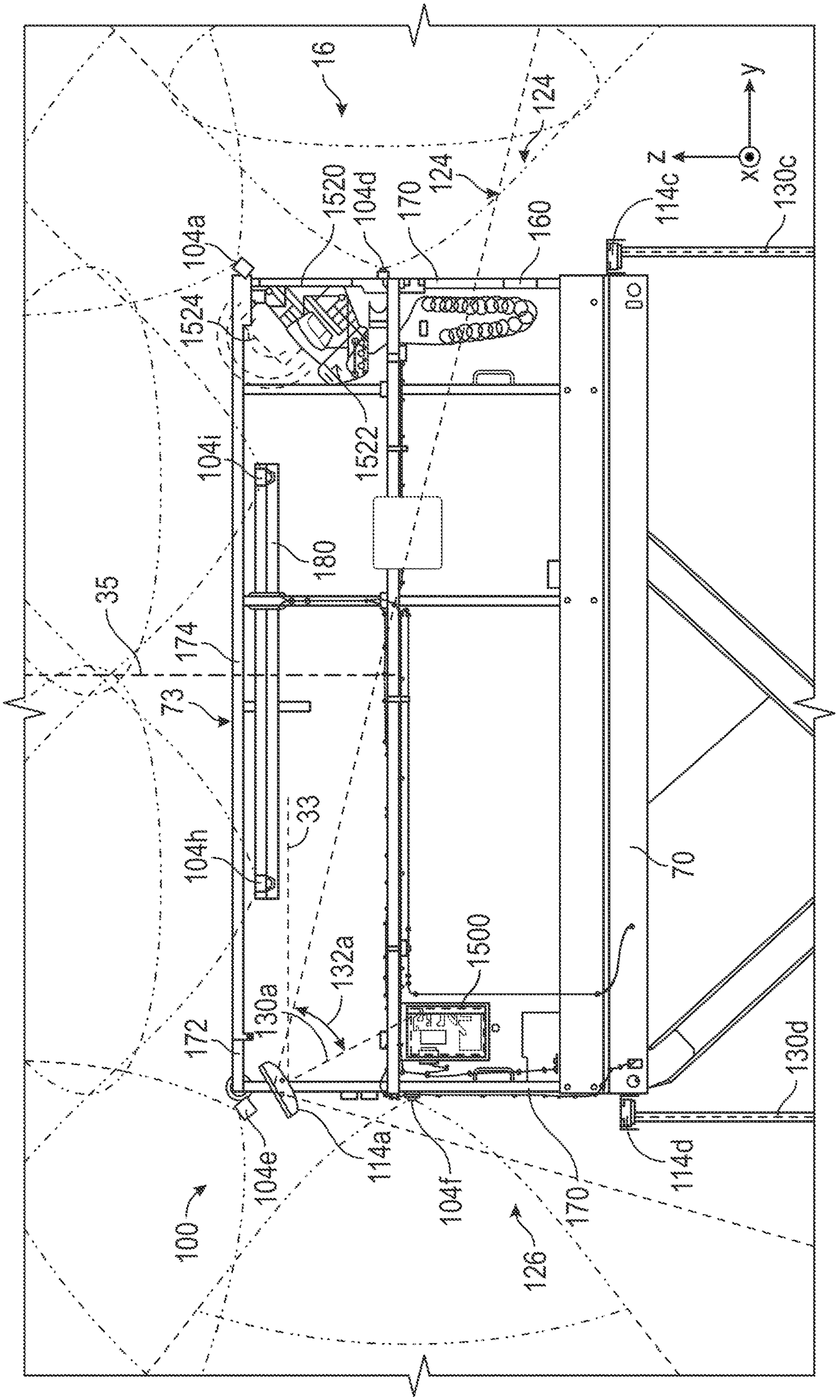
FIG. 6 is a side view of the platform of the lift device of FIG. 5, including various proximity sensors, according to an exemplary embodiment.

Referring now to FIGS. 5-6, the platform 16 further includes a detection system, an obstacle detection system, etc., shown as object detection system 100, according to an exemplary embodiment. The platform 16 defines a longitudinal axis 33, a lateral axis 31 that is perpendicular to the longitudinal axis 33, and a vertical axis 35 that is perpendicular to both the longitudinal axis 33 and the lateral axis 31. An x-y-z coordinate system is also defined, with the x-direction extending along the lateral axis 31, the y-direction extending along the longitudinal axis 33, and the z-direction extending along the vertical axis 35. The positive z direction indicates an upwards direction of the lift device 10. The negative z direction indicates a downwards direction of the lift device 10. The positive y direction indicates a frontwards direction of the lift device 10. The negative y direction indicates a backwards direction of the lift device 10. The positive x direction indicates a right direction of the lift device 10. The negative x direction indicates a left direction of the lift device 10. The object detection system 100 includes a first set of proximity sensors, shown as ultrasonic sensors 104, and a second set of proximity sensors, shown as lidar sensors 114, according to an exemplary embodiment. The object detection system 100 also includes a controller 1500. The controller 1500 is configured to receive object detection information from any of the ultrasonic sensors 104 and the lidar sensors 114. The controller 1500 is also configured to receive sensor information from a lift assembly sensor 115 (see FIG. 3). The controller 1500 may be positioned in any of the locations shown in FIG. 6, anywhere else on the platform 16, or may be positioned at the frame assembly 12. The ultrasonic sensors 104 may be any sensor configured to emit an ultrasonic wave and receive a reflected ultrasonic wave to determine a relative distance between the ultrasonic sensors 104 and an object (e.g., object 102 such as the wing of an aircraft as shown in FIG. 3). One or more of the ultrasonic sensors 104 may be pointed at least partially in an upwards direction (e.g., at least partially in the positive z direction or at least partially along vertical axis 35) to detect objects, obstacles, obstructions, overhangings, etc., above platform 16 (e.g., objects above platform 16 in the z direction). The ultrasonic sensors 104 may be positioned about an outer perimeter of platform 16. One or more of the ultrasonic sensors 104 may point at least partially outwards from platform 16 in the x-y plane (e.g., one or more of the ultrasonic sensors 104 may point at least partially along longitudinal axis 33 and/or at least partially along lateral axis 31) to detect objects, obstacles, obstructions, etc., in the surroundings of the platform 16. In an exemplary embodiment, the ultrasonic sensors 104 are configured to determine a relative distance (e.g., a scalar quantity) between platform 16 and an object (e.g., the object 102).

The lidar sensors 114 may be any proximity sensor configured to emit light (e.g., a laser) and determine proximity as well as relative location of an object (e.g., object 106) within a scan area 84 (see FIGS. 2-4) of the lidar sensors 114. One or more of the lidar sensors 114 is/are configured to point at least partially in a downwards direction (e.g., at least partially in a negative z-direction, at least partially along vertical axis 35 in a direction below the platform 16, etc.) to detect objects within the scan area 84 that are below/beneath platform 16. The lidar sensors 114 emit multiple lasers (e.g., eleven) to detect the presence of objects in the scan area 84. The multiple lasers may be spaced apart over the entire sweep of angle 134 at equiangular positions (e.g., the angular displacement between adjacent lasers is equal) to detect the presence of objects over the scan area 84. The lidar sensors 114 may be configured to monitor an amount of time between when the laser is emitted and when the lidar sensor 114 measures a return of the light to the lidar sensor 114. The time between when the laser/light is emitted and when the lidar sensor 114 measures the return of the light may be referred to as the time of flight, $\Delta t_{flight}$. The lidar sensors 114 determine a relative location of the object that reflects the light. The distance of the relative location between the object (e.g., the object 106) and the lidar sensor 114 may be determined as:

$$d = \frac{c\Delta t_{flight}}{2}$$

where c is the speed of light. The angle θ of the object and the lidar sensor 114 may be the angle at which the laser is emitted. From the relative distance d and the angle θ at which the laser/light is emitted, the relative location of the object can be determined. If the lidar sensor 114 does not measure a return of light, this indicates that there is no object present at the current angular position of the lidar sensor 114. The lidar sensors 114 may emit lasers having a wavelength between 600 and 1000 nanometers. In other embodiments, the lidar sensors 114 emit lasers having a wavelength greater than 1000 nanometers (e.g., 1550 nanometers) or shorter than 600 nanometers (e.g., 532 nanometers). The scan area 84 of each of the lidar sensors 114 may be a two dimensional plane such that each of the lidar sensors 114 determines one or more relative locations (e.g., polar coordinates, Cartesian coordinates, etc.) of various points on the object relative to the respective lidar sensor 114.

The ultrasonic sensors 104 are generally oriented outwards and/or upwards, while the lidar sensors 114 are generally oriented downwards. Orienting the lidar sensors 114 downwards facilitates an object detection system 100 that is less prone to obstructions and direct sunlight which could potentially cause inaccurate measurements from the lidar sensors 114. Additionally, the lidar sensors 114 are positioned (and the ultrasonic sensors 104 are oriented) such that the lidar sensors 114 do not interfere with the ultrasonic sensors 104. While the present disclosure refers to lidar sensors and ultrasonic sensors, it is contemplated that other types of sensors could be used. For example, in some embodiments, all of the sensors 104 and 114 are lidar sensors. Any proximity sensor configured to measure the relative location of an object may be used in place of the lidar sensors 114. Likewise, any proximity sensor configured to measure relative distance of an object may be used in place of the ultrasonic sensors 104.

Referring still to FIGS. 5-6, the object detection system 100 includes lidar sensors 114*a*-114*d*, according to an exemplary embodiment. The platform 16 may include one or more of the lidar sensors 114 on each side of the platform 16.

In an exemplary embodiment, the platform 16 includes four lidar sensors 114, shown as lidar sensor 114_a_ positioned on a first longitudinal end 120 of the platform 16, lidar sensor 114_b_ positioned on a second longitudinal end 122 of the platform 16, lidar sensor 114_c_ positioned on a first lateral end 124 of the platform 16, and lidar sensor 114_d_ positioned on a second lateral end 126 of the platform 16. In other embodiments, the platform 16 includes only two lidar sensors 114 (e.g., only two of the lidar sensors 114_a_-114_d_). For example, the platform 16 may include only the lidar sensor 114_a_ positioned on the first longitudinal end 120 of the platform and the lidar sensor 114_b_ positioned on the second longitudinal end 122 of the platform 16. In other embodiments, the platform 16 includes more than four of the lidar sensors 114. For example, the platform 16 may include multiple lidar sensors 114 positioned on the first longitudinal end 120 and/or multiple lidar sensors 114 positioned on the second longitudinal end 122 of the platform 16.

In an exemplary embodiment, lidar sensor 114_b_ is positioned and/or oriented symmetrically/similarly to lidar sensor 114_a_. Likewise, lidar sensor 114_d_ may be positioned and/or oriented symmetrically/similarly to lidar sensor 114_c_.

Each of lidar sensors 114 include a central axis 130, according to an exemplary embodiment. Central axis 130 extends radially outwards from a corresponding lidar sensor 114. Central axis 130 may define the orientation of the corresponding lidar sensor 114. For example, as shown in FIGS. 3 and 6, the lidar sensor 114_a_ include central axis 130_a_. Central axis 130_a_ extends radially outwards from lidar sensor 114_a_ and defines an orientation of the lidar sensor 114_a_. Lidar sensors 114 each have an angular scan range, shown as angle 134. Angle 134 may be defined between centerline 86 and centerline 87 which indicate initial/first and final/second angular positions of the corresponding lidar sensor 114 (or the outermost angular orientations of the outermost emitted lasers), respectively. In an exemplary embodiment, angle 134 is 90 degrees. In other embodiments, angle 134 is greater than 90 degrees (e.g., 120 degrees) or less than 90 degrees (e.g., 45 degrees). Central axis 130 of the corresponding lidar sensor 114 extends through the scan area 84 of the lidar sensor 114 and bisects angle 134. For example, as shown in FIG. 3, the central axis 130_a_ of the lidar sensor 114_a_ bisects the angle 134_a_ of the lidar sensor 114_a_ and is oriented at angle 132_a_ relative to longitudinal axis 33 (e.g., angle 132 relative to an axis extending in the y-direction).

Figure 2:
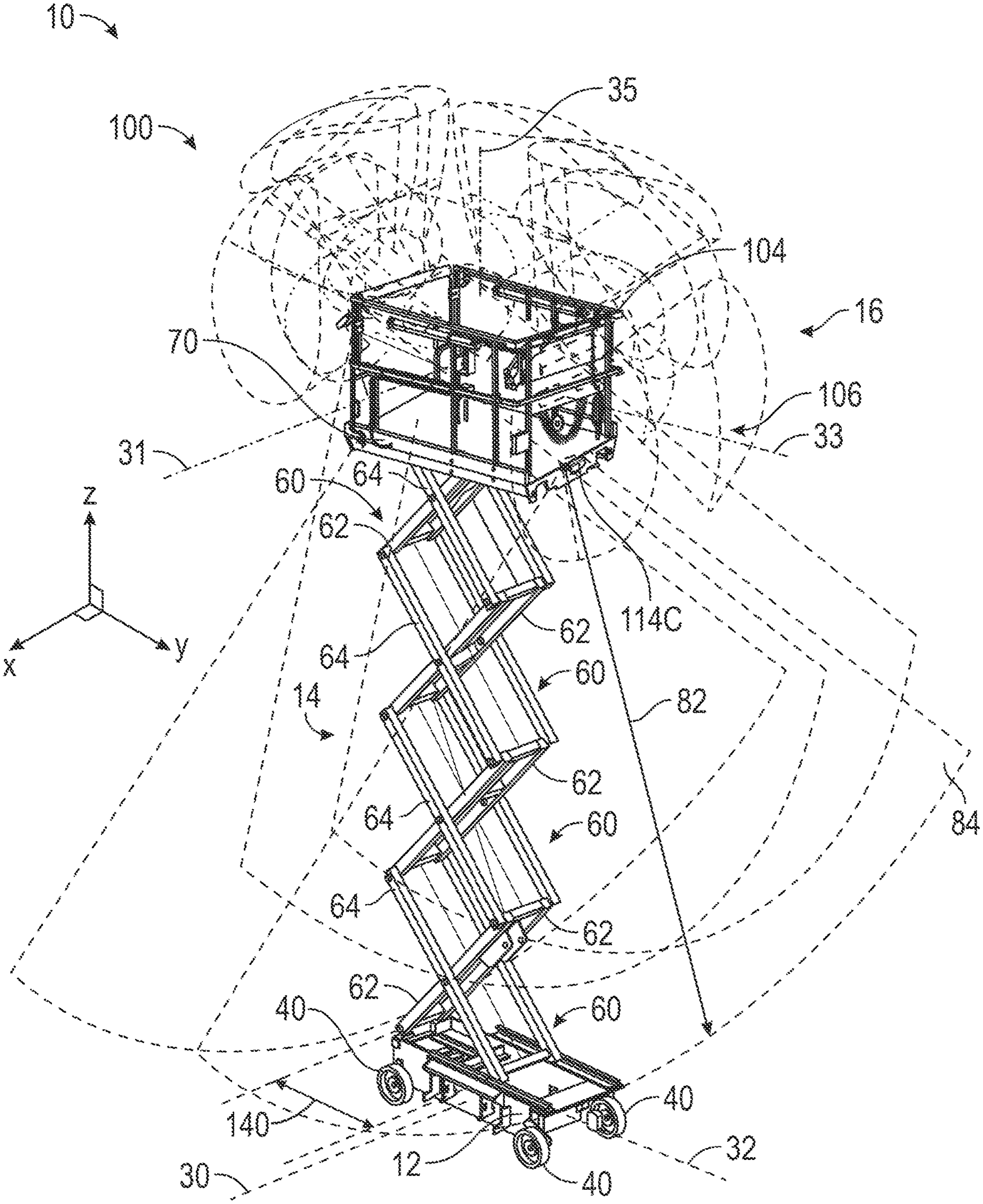
FIG. 2 is a perspective view of the lift device of FIG. 1, including various proximity sensors, according to an exemplary embodiment.

Referring now to FIG. 2, each of the lidar sensors 114 may have a maximum sensing range, shown as distance 82, according to an exemplary embodiment. The distance 82 indicates a maximum distance relative to the corresponding lidar sensor 114 over which objects can be detected. The distance 82 and the angle 134 define the scan area 84. The scan area 84 can have the shape of a sector of a circle having a radius equal to the distance 82. The scan area 84 may have be an area $$A = \pi r^2 \left(\frac{\theta}{360}\right)$$

where r is the distance 82 and θ is the angle 134. The scan area 84 defines a total planar area throughout which objects can be detected by the corresponding lidar sensor 114.

Scan Area and Sensor Orientation

Referring now to FIG. 3, the scan area 84 includes a first area, portion, zone, etc., shown as stop zone 90, a second area, portion, zone, etc., shown as warning zone 92, and a third area, portion, zone, etc., shown as warning zone 93 according to an exemplary embodiment. The stop zone 90 may be a portion of the scan area 84 that is below/beneath the platform 16. The warning zones 92 and 93 are portions of the scan area 84 that is nearby and/or beneath the platform 16. In an exemplary embodiment, the warning zones 92 are adjacent the stop zone 90. FIG. 2 shows the scan area 84_a_ of lidar sensor 114_a_, according to an exemplary embodiment. It should be noted that the scan area 84 of any of the lidar sensors 114 may defined similarly to the scan area 84_a_ of the lidar sensor 114_a_ as shown in FIG. 3. For example, each of the lidar sensors 114 may include stop zone 90, warning zone 92, and warning zone 93 defined similarly to stop zone 90_a_, warning zone 92_a_, and warning zone 93_a_ of the scan area 84_a_, respectively. The stop zone 90_a_ of the lidar sensor 114_a_ may be defined as any portion of the scan area 84_a_ that is below platform 16. Alternatively, the stop zone 90_a_ may be defined as any portion of the scan area 84_a_ that covers a current longitudinal width 140 of the lift assembly 14. The stop zone 90_a_ may have longitudinal width 142_a_, according to an exemplary embodiment. The longitudinal width 142_a_ may be substantially equal to the current longitudinal width 140 of the lift assembly 14, greater than the current longitudinal width 140 of the lift assembly 14 (by some predetermined amount), substantially equal to a longitudinal length of the platform 16, or greater than the longitudinal length of the platform 16 (by some predetermined amount). If the longitudinal width 142_a_ of the stop zone 90_a_ is related to the current longitudinal width 140 of the lift assembly 14 (e.g., substantially equal to the current longitudinal width 140 or greater than the current longitudinal width 140 by some predetermined amount), the stop zone 90_a_ changes as the lift assembly 14 extends. As the lift assembly 14 extends (thereby moving the platform 16 in the positive z direction, or upwards along the vertical axis 35), the current longitudinal width 140 of the lift assembly 14 decreases. Likewise, as the lift assembly 14 retracts (thereby moving the platform 16 in the negative z direction), the current longitudinal width 140 of the lift assembly 14 decreases. In some embodiments, the current longitudinal width 140 of the lift assembly 14 is a maximum current longitudinal width of the lift assembly 14 measured along the longitudinal axis 33 between outermost points of the lift assembly 14. In this way, the stop zone 90_a_ can vary based on a current degree of extension of the lift assembly 14.

The warning zone 92_a_ and the warning zone 93_a_ may be defined as portions of the scan area 84_a_ directly adjacent the stop zone 90_a_, according to an exemplary embodiment. The warning zone 92_a_ may have a maximum longitudinal width 146_a_. Likewise, the warning zone 93_a_ may have a maximum longitudinal width 144_a_. The warning zone 92_a_ may be defined as any portion of the scan area 84_a_ that lies within the maximum longitudinal width 146_a_ from a first end of the stop zone 90_a_. Likewise, the warning zone 93_a_ may be defined as any portion of the scan area 84_a_ that lies within the maximum longitudinal width 144_a_ from a second opposite end of the stop zone 90_a_. In some embodiments, the maximum longitudinal width 144_a_ is substantially equal to the maximum longitudinal width 146_a_. In other embodiments, the maximum longitudinal width 144_a_ is less than or greater than the maximum longitudinal width 146_a_. The warning zone 93_a_ of lidar sensor 114_a_ may define an area adjacent the stop zone 90_a_ at the first lateral end 124 of the platform 16. The warning zone 92_a_ may define an area adjacent the stop zone 90_a_ at the second lateral end 126 of the platform 16. The lidar sensor 114_a_ is configured to monitor/detect the presence and relative location of any objects within the scan area 84*a*. The lidar sensor 114*a* also detects whether objects within the scan area 84*a* are within the warning zone 92*a*, the stop zone 90*a*, and the warning zone 93*a*.

As shown in FIG. 3, the scan area 84*a* of the lidar sensor 114*a* is defined in the z-y plane, according to an exemplary embodiment. The orientation of the lidar sensor 114*a* defines the plane of the scan area 84*a*. In an exemplary embodiment, the central axis 130*a* is in the z-y plane such that the scan area 84*a* lies completely within the z-y plane. In other embodiments, the lidar sensor 114*a* points in a direction such that the scan area 84*a* is not defined in the z-y plane. For example, the lidar sensor 114*a* may be angled outwards (about the longitudinal axis 33) such that the scan area 84 is not coplanar with the z-y plane.

The lidar sensor 114*a* is angled about the lateral axis 31 (i.e., the x-direction) such that an angle 132*a* is defined between the central axis 130*a* and the longitudinal axis 33. In some embodiments, the angle 132*a* is substantially equal to 0 degrees such that the lidar sensor 114*a* points in the y-direction (e.g., points along the longitudinal axis 33). In an exemplary embodiment, the angle 132*a* is 60 degrees. The angular scan range (e.g., angle 134*a*) and the orientation of the lidar sensor 114*a* (e.g., angle 132*a*) may be adjusted to achieve a desired scan area 84*a* in some embodiments. The centerline 86*a* and the longitudinal axis 33 define an angle 150*a*. Likewise, the centerline 87*a* and the longitudinal axis 33 define an angle 152*a*. The angular orientation of the centerline 86*a* (e.g., angle 150*a*, the angular position of the first outermost laser or the initial angular position of the lidar sensor 114*a*) and the angular orientation of the centerline 87*a* (e.g., angle 152*a*, the angular position of the other outermost laser or the final angular position of the lidar sensor 114*a*) can be adjusted to achieve a desired scan area 84*a*. For example, the angle 150*a* may be substantially equal to 90 degrees such that the lidar sensor 114*a* initially (or the first outermost laser of the lidar sensor 114*a*) points substantially in the negative z-direction (i.e., along the vertical axis 35). Likewise, the angle 152*a* may be a value (e.g., 0 degrees) such that a portion (e.g., protrusion 160 as shown in FIGS. 5-8) of the platform 16 lies within the scan area 84*a* of the lidar sensor 114*a*.

Lidar sensor 114*b* may be positioned and oriented similarly/symmetrically to lidar sensor 114*a*. In other embodiments, lidar sensor 114*b* is positioned similarly/symmetrically to lidar sensor 114*a* and is mirrored about the x-z plane. Lidar sensor 114*b* is similarly configured to monitor/detect objects within a scan area 84*b*. Lidar sensor 114*b* can be similarly configured to monitor/detect objects within a stop zone 90*b*, a warning zone 92*b*, and a warning area 93*b*. The stop zone 90*b* of the lidar sensor 114*b* may be defined similarly to the stop zone 90*a* of the lidar sensor 114*a* (e.g., a portion of the scan area 84 below the platform 16 or a portion of the scan area 84 that covers the lift assembly 14). Likewise, the warning area 92*b* and the warning area 93*b* of the lidar sensor 114*b* may be defined similarly to the warning area 92*a* and the warning zone 93*a* of the lidar sensor 114*a*, respectively. However, the lidar sensor 114*b* is positioned on a longitudinal side (i.e., longitudinal end 122) of the platform 16 opposite the longitudinal side (i.e., longitudinal end 120) of the lidar sensor 114*a*.

Figure 4:
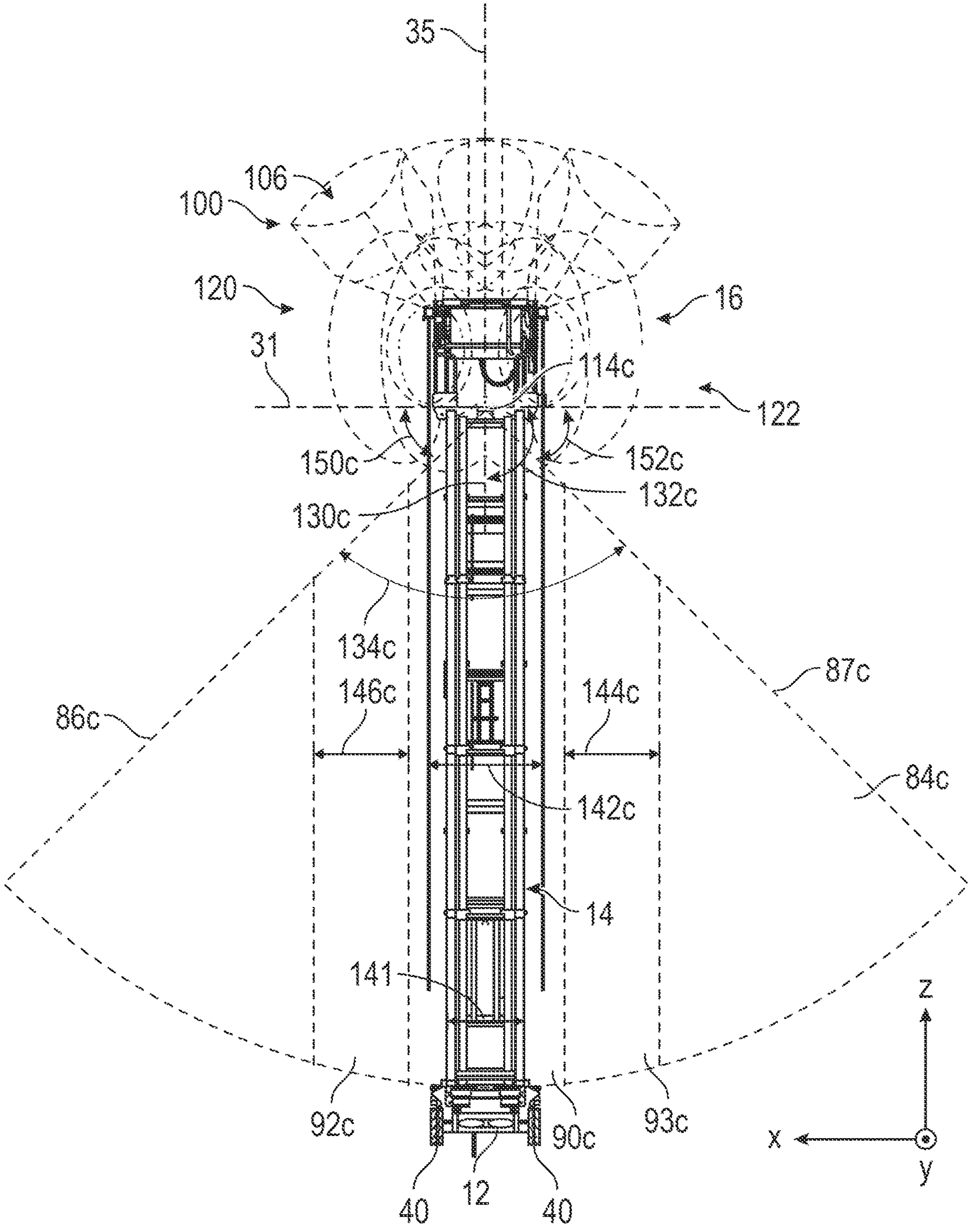
FIG. 4 is a front view of the lift device of FIG. 1, showing scan areas of one or more of the proximity sensors of FIG. 2, according to an exemplary embodiment.

Referring now to FIG. 4, scan area 84*c* of the lidar sensor 114*c* is shown, according to an exemplary embodiment. The lidar sensor 114*c* may be configured similarly to the lidar sensor 114*a*. The lidar sensor 114*c* may be oriented such that it points downwards (i.e., in the negative z-direction, along vertical axis 35). Similar to the lidar sensor 114*a*, the lidar sensor 114*c* monitors/detects objects within the scan area 84*c*. The scan area 84*c* may be defined similarly to the scan area 84*a* of the lidar sensor 114*a*. In some embodiments, the scan area 84*c* is in a plane that is normal to the plane of the scan area 84*a*. For example, the scan area 84*c* includes stop zone 90*c*, warning zone 92*c*, and warning zone 93*c*. However, the scan area 84*c* of lidar sensor 114*c* is coplanar with the x-z plane rather than the z-y plane, as is the scan area 84*a*. Width 144*c* of the warning zone 93*c* is a lateral width (e.g., a distance measured along the lateral axis 31) as opposed to a longitudinal width as is the longitudinal width 144*a* that defines warning zone 93*a*. Likewise, width 142*c* of the stop zone 90*c* and width 146*c* of the warning zone 92*c* are lateral widths (e.g., measured along the lateral axis 31) as opposed to longitudinal widths. The stop zone 90*c* may similarly be a portion of scan area 84*c* below the platform 16 or a portion of scan area 84*c* that covers lateral width 141 of the lift assembly 14. Likewise, the warning zone 92*c* and the warning zone 93*c* are portions of the scan area 84*c* adjacent the stop zone 90*c* on either side of the stop zone 90*c*.

Figure 7:
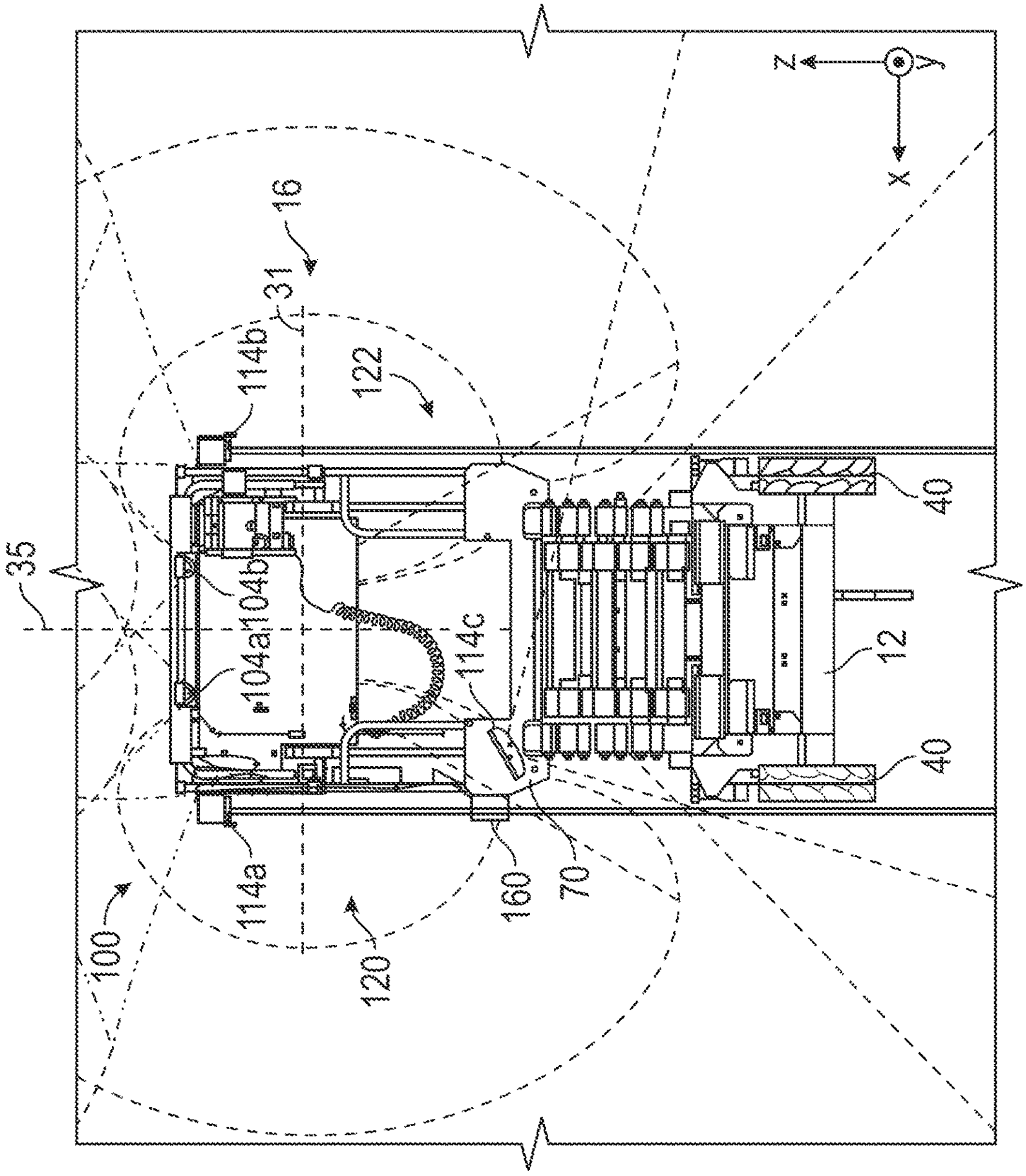
FIG. 7 is a front view of the lift device of FIG. 1, according to an exemplary embodiment.

As shown in FIG. 4, the lidar sensor 114*c* may be oriented such that it points directly downwards (e.g., in the negative z-direction, along the vertical axis 35 in a direction that points below the platform 16, etc.). An angle 132*c* is defined between the central axis 130*c* of the lidar sensor 114*c* and the lateral axis 31 (or between the central axis 130*c* of the lidar sensor 114*c* and an axis along the x-direction). If the lidar sensor 114*c* points directly downwards, the angle 132*c* is 90 degrees. In other embodiments, the lidar sensor 114 is oriented such that it points in a direction other than straight down. For example, the lidar sensor 114 may be oriented such that angle 132*c* is 60 degrees (e.g., central axis 130*c* is 60 degrees below the lateral axis 31 as oriented in FIG. 7). Scan area 84*c* includes centerline 87*c* and centerline 86*c*. Centerline 87*c* and centerline 86*c* define the angular outermost edges of the scan area 84*c*. Angle 152*c* is defined between the centerline 87*c* and the lateral axis 31. Angle 150*c* is defined between the centerline 86*c* and the lateral axis 31. As shown in FIG. 4, the angle 150*c* and the angle 152*c* are substantially both equal to 45 degrees. In other embodiments, the angle 150*c* and the angle 152*c* are non-equal to each other. For example, the angle 150*c* may be 75 degrees (as shown in FIG. 7). Likewise, the angle 152*c* may be a value other than 45 degrees. For example, the angle 152*c* may have a value of 15 degrees (as shown in FIG. 7). In an exemplary embodiment, angle 134*c* (measured between centerline 86*c* and centerline 87*c*) is 90 degrees. In other embodiments, angle 134*c* (the scan angle of the lidar sensor 114*c*) is greater than 90 degrees (e.g., 120 degrees) or less than 90 degrees (e.g., 60 degrees as oriented in FIG. 7).

The lidar sensor 114*d* can be configured and oriented similarly to the lidar sensor 114*c*. For example, the lidar sensor 114*d* may be configured to monitor/detect objects within a scan area 84*d* that is similar to the scan area 84*c*. The lidar sensor 114*d* may be configured and oriented similar to the lidar sensor 114*c*, but is positioned at an opposite lateral end (i.e., second lateral end 126 as opposed to first lateral end 124). In other embodiments, one of the lidar sensor 114*c* and the lidar sensor 114*d* is oriented such that it points directly downwards (i.e., in the negative z-direction, downwards along the vertical axis 35), while the other one of the lidar sensor 114*c* and the lidar sensor 114*d* is oriented at an angle (i.e., angle 132*c* is greater than or less than 90 degrees). For example, the lidar sensor 114*c* may be positioned at the first lateral end 124 and oriented as shown in FIG. 4, while the lidar sensor 114 is positioned at the second lateral end 126 and is oriented as shown in FIG. 7 (i.e., the angle 132*c* is 60 degrees). The lidar sensor 114*d* may be oriented such that the lidar sensor 114*d* does not detect the lift assembly 14 (e.g., the lidar sensor 114*d* may be angled slightly outwards, forming an angle between the longitudinal axis 33 and the centerline 130*d* slightly greater than 90 degrees). The lidar sensor 114*d* may also be offset along the longitudinal axis 33 in the negative y direction such that it does not detect the lift assembly 14 (e.g., an outer corner of the lift assembly 14). Likewise, the lidar sensor 114*c* may be offset in the positive y direction along the longitudinal axis 33 or angled slightly outwards such that the lidar sensor 114*c* does not detect the lift assembly 14 therebelow.

Referring again to FIGS. 5 and 6, the lidar sensor 114*a* is positioned (e.g., mounted, attached, connected, coupled, fixedly coupled, removably coupled etc.) at the second lateral end 126 to a vertical member, an elongated member, a support member, a structural component, a tube, a rail, a bar, etc., shown as vertical rail 170. The lidar sensor 114*a* protrudes outwards from the first longitudinal end 120 of the vertical rail 170 at least partially along lateral axis 31. The vertical rail 170 is configured to provide structural support to guard rails 72. In other embodiments, the lidar sensor 114*a* is positioned to a vertical rail 170 at the first lateral end 126 of the platform 16. In other embodiments, the lidar sensor 114*a* is coupled to the deck 70 of the platform 16 at the second lateral end 126 or the first lateral end 124, or at some position on the deck 70 between the second lateral end 126 and the first lateral end 124 (e.g., half way between the first lateral end 124 and the second lateral end 126). In other embodiments, the lidar sensor 114*a* is coupled to an upper most guard rail 73 of the guard rails 72. The lidar sensor 114*a* may be coupled to the upper most guard rail 73 at any of the second lateral end 126 of the platform 16, the first lateral end 124 of the platform, or at some position between the second lateral end 126 of the platform 16 and the first lateral end 124 of the platform (e.g., coupled to the upper most guard rail 73 at a midpoint of the upper most guard rail 73 along the longitudinal axis 33).

In some embodiments, if the platform 16 includes extendable decks 78, the upper most guard rail 73 is a telescoping rail. The upper most guard rail 73 includes an outer member 174 and an inner member 172. The outer member 174 is configured to receive the inner member 172 therewithin. When the extendable deck 78 is extended, the outer member 174 moves relative to the inner member 172. If the platform 16 includes the extendable deck 78, the lidar sensor 114*a* is coupled to a portion that remains stationary relative to the outer member 174 (e.g., to the inner member 172).

The guard rails 72 may include a protrusion 160. The protrusion 160 may be coupled (e.g., coupled directly or coupled indirectly) to outer member 174 such that the protrusion 160 moves relative to the inner member 172 as the extendable deck 78 is extended. The lidar sensor 114*a* is configured to track a position (e.g., a relative distance) of the protrusion 160 to determine a degree of extension of the extendable deck 78. The lidar sensor 114*a* may be coupled to a component of the platform 16 that remains stationary relative to the extendable deck 78. In this way, the lidar sensor 114*a* can monitor a degree of extension of the extendable deck 78.

The lidar sensor 114*b* that is positioned on the side of the platform 16 opposite the lidar sensor 114*a* (e.g., on the second longitudinal end 122) may be configured and/or oriented similarly to the lidar sensor 114*a*. For example, the lidar sensor 114*b* may be coupled (e.g., mounted) to the platform 16 on the second longitudinal end 122) at any of the positions as described hereinabove with reference to the lidar sensor 114*a*.

Referring now to FIGS. 5 and 7, the lidar sensor 114*c* is positioned (e.g., mounted, coupled, attached, fixed, removably coupled, welded, etc.) on the deck 70 at the first lateral end 124 of the platform 16. The lidar sensor 114*c* may be positioned at a lateral centerpoint of the deck 70 (as shown in FIG. 5). In other embodiments, the lidar sensor 114*c* is positioned at one of the corners of the deck 70 (e.g., at the corner of the deck 70 near the first longitudinal end 120 as shown in FIG. 7, at the corner of the deck 70 near the second longitudinal end 122, etc.).

The lidar sensor 114*d* may be positioned and/or oriented on the opposite end of the platform 16 according to any of the positions and/or orientations of the lidar sensor 114*c* as described in greater detail hereinabove. For example, the lidar sensor 114*d* may be coupled to the deck 70 at a lateral midpoint of the deck 70, at a corner of the deck 70, etc., and may be oriented pointing directly downwards, partially downwards, at an angle, etc.

Referring again to FIG. 5, the platform 16 is shown to include four of the ultrasonic sensors 104 coupled to the first lateral end 124. Ultrasonic sensor 104*c* and ultrasonic sensor 104*d* are coupled to the guard rails 72 and point outwards from the first lateral end 124. Ultrasonic sensor 104*c* and ultrasonic sensor 104*d* may point in a direction completely in the x-y plane. The ultrasonic sensor 104*c* and the ultrasonic sensor 104*d* are configured to monitor/detect the presence of objects in front of (e.g., in areas beyond the first lateral end 124 in the y direction) the platform 16 (e.g., while an operator is driving the lift device 10 in the forward direction). The ultrasonic sensor 104*c* and the ultrasonic sensor 104*d* are shown angled outwards relative to the longitudinal axis 33. In some embodiments, the ultrasonic sensor 104*c* and the ultrasonic sensor 104*d* are oriented at equal angles outwards from the longitudinal axis 33. In other embodiments, the ultrasonic sensor 104*c* and/or the ultrasonic sensor 104*d* point in a direction other than completely in the x-y plane. Ultrasonic sensor 104*f* and ultrasonic sensor 104*g* may be similarly configured and oriented at the second lateral end 126 of the platform 16. The ultrasonic sensor 104*f* and the ultrasonic sensor 104*g* may be coupled to the vertical rails 170 at the second lateral end 126 of the platform 16. The ultrasonic sensor 104*f* and the ultrasonic sensor 104*g* are configured to detect/monitor the presence of objects/obstacles behind (e.g., in areas beyond the second lateral end 126 in the negative y direction) the platform 16.

The platform 16 also includes ultrasonic sensor 104*a* and ultrasonic sensor 104*b* at the first lateral end 124 of the platform 16. The ultrasonic sensor 104*a* and the ultrasonic sensor 104*b* are coupled to a support member 180. The support member 180 may be coupled to the upper most guard rail 73 at the first lateral end 124 of the platform 16. In other embodiments, the ultrasonic sensor 104*a* and the ultrasonic sensor 104*b* are coupled directly to the upper most guard rail 73 (e.g., to the outer member 174). The support member 180 may have an overall length substantially equal to or less than an overall lateral length of the platform 16. The ultrasonic sensor 104*a* and the ultrasonic sensor 104*b* are positioned a distance apart along the length of the support member 180. The ultrasonic sensor 104*a* and the ultrasonic sensor 104*b* may be positioned at opposite ends of the support member 180.

The ultrasonic sensor 104*a* and the ultrasonic sensor 104*b* point in a direction at least partially upwards. The ultrasonic sensor 104*a* and the ultrasonic sensor 104*b* are configured to detect objects above the platform 16 at the first lateral end 124 of the platform 16 (e.g., beyond the first lateral end 124 of the platform 16 in the positive y direction and above the platform 16 in the positive z direction). In some embodiments, the ultrasonic sensor 104*a* and the ultrasonic sensor 104*b* are coupled (either directly, or indirectly by being coupled to the support member 180) to outer member 174 and move relative to inner member 172 as the extendable deck 78 is extended.

The platform 16 also includes ultrasonic sensor 104*e* and ultrasonic sensor 104*d* at the second lateral end 126 of the platform 16. The ultrasonic sensor 104*e* and the ultrasonic sensor 104*d* may be coupled to a support member 180 at the second lateral end 126 of the platform 16 similar to the support member 180 at the first lateral end 124 of the platform 16. The support member 180 at the second lateral end 126 of the platform 16 may be similar to the support member 180 at the first lateral end 124 of the platform 16 (e.g., coupled to the upper most guard rail 73). The ultrasonic sensor 104*e* and the ultrasonic sensor 104*d* may be coupled to the platform 16 and oriented similar to the ultrasonic sensor 104*a* and the ultrasonic sensor 104*b*, respectively. For example, the ultrasonic sensor 104*e* and the ultrasonic sensor 104*d* may be configured to detect/monitor the presence of objects/obstacles above the platform 16 at the second lateral end 126 of the platform 16 (e.g., to detect/monitor the presence of objects beyond the second lateral end 126 in the negative y direction and above the platform 16 in the positive z direction).

Referring still to FIG. 5, the platform 16 includes ultrasonic sensor 104*i* and ultrasonic sensor 104*h*. Ultrasonic sensor 104*i* and ultrasonic sensor 104*h* are coupled at the first longitudinal end 120 of the platform 16. Ultrasonic sensor 104*i* and ultrasonic sensor 104*h* may be coupled to the upper most guard rail 73. In some embodiments, ultrasonic sensor 104*i* and ultrasonic sensor 104*h* are coupled to a support member 180. The support member 180 extends at least partially along the first longitudinal end 120 of the platform 16. The support member 180 is coupled to the upper most guard rail 73. Ultrasonic sensor 104*h* and ultrasonic sensor 104*i* are positioned at opposite ends of the support member 180. Ultrasonic sensor 104*h* and ultrasonic sensor 104*i* are oriented in a direction to monitor/detect the presence of objects to the right of the platform 16 (e.g., to monitor/detect the presence of objects beyond the first longitudinal end 120 of the platform 16 in the positive x direction and above the platform 16 in the positive z direction). Ultrasonic sensor 104*h* and ultrasonic sensor 104*i* can be similarly oriented and positioned at opposite ends of the support member 180. The ultrasonic sensor 104*h* and the ultrasonic sensor 104*i* can be coupled to the outer member 174 such that the ultrasonic sensor 104*h* and the ultrasonic sensor 104*i* translate with the outer member 174 relative to the inner member 172. In other embodiments, the ultrasonic sensor 104*h* and the ultrasonic sensor 104*i* are coupled with the inner member 172 such that the ultrasonic sensor 104*h* and the ultrasonic sensor 104*i* remain stationary relative to the inner member 172 as the outer member 174 translates to extend the extendable deck 78.

Referring still to FIG. 5, the platform 16 includes ultrasonic sensor 104*j* and ultrasonic sensor 104*k* at the second longitudinal end 122 of the platform 16. The ultrasonic sensor 104*j* and the ultrasonic sensor 104*k* point outwards and upwards from the second longitudinal end 122 of the platform 16. The ultrasonic sensor 104*j* and the ultrasonic sensor 104*k* may be configured and oriented similarly to the ultrasonic sensor 104*i* and the ultrasonic sensor 104*k*, respectively. For example, the ultrasonic sensor 104*j* and the ultrasonic sensor 104*k* may be coupled to a support member 180, directly to the outer member 174 of the upper most guard rail 73, etc. The ultrasonic sensor 104*j* and the ultrasonic sensor 104*k* are configured to monitor/detect the presence of objects to the left of and above (e.g., beyond the second longitudinal end 122 in the negative x direction and above the platform 16 in the positive z direction) the platform 16.

Ultrasonic Sensors

Figure 11:
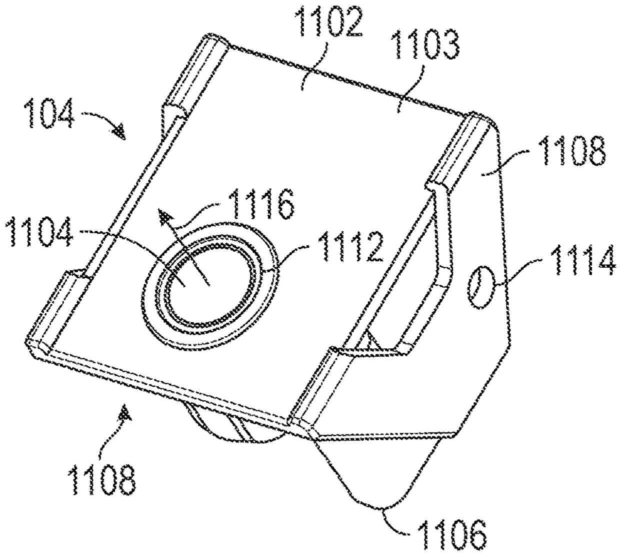
FIGS. 11-12 are perspective views of one of the proximity sensors of the lift device of FIG. 2, according to an exemplary embodiment.
Figure 12:
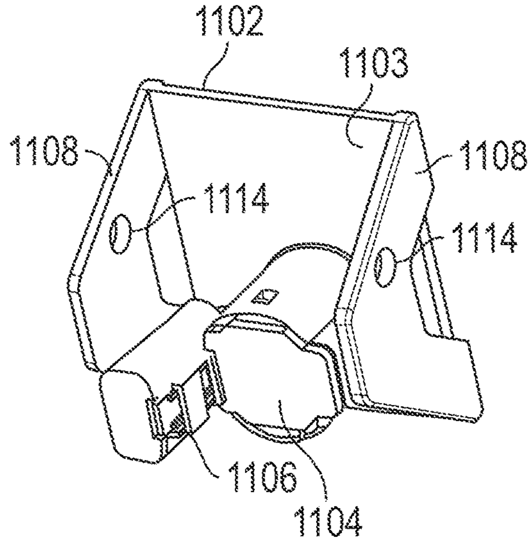

Referring now to FIGS. 11-12, one of the ultrasonic sensors 104 is shown in greater detail, according to an exemplary embodiment. The ultrasonic sensor 104 includes a housing 1102 having a center portion 1103 and side portions 1108. The side portions 1108 extend in a same direction perpendicularly from outer edges of the center portion 1103. The center portion 1103 includes a window, an opening, a hole, etc., shown as aperture 1112 configured to receive an ultrasonic emitter/receiver 1104 therewithin. The side portions 1108 include one or more fastener interfaces 1114 (e.g., through holes, bores, apertures, etc.) configured to facilitate attachment of the ultrasonic sensor 104 to a supporting member (e.g., to any of the guard rails 72 of the platform 16, to the support member 180, etc.). The ultrasonic emitter/receiver 1104 extends through the aperture 1112 and includes an electrical connector 1106. The electrical connector 1106 facilitates electrical and communicable connection between a controller (e.g., controller 1500) and the ultrasonic emitter/receiver 1104.

Referring still to FIGS. 11-12, a unit vector 1116 is shown extending normally outwards from a surface of the ultrasonic emitter/receiver 1104, according to an exemplary embodiment. The unit vector 1116 points in a direction which the ultrasonic waves are emitted by the ultrasonic emitter/receiver 1104. The unit vector 1116 may define an orientation of the ultrasonic sensor 104. It should be understood that any references to "orientation" "angulation" "angle" "direction," etc. throughout the present disclosure with reference to any of the ultrasonic sensors 104 may refer to the orientation of the unit vector 1116 in a coordinate system (e.g., in an x-y-z coordinate system, relative to lateral axis 31, relative to longitudinal axis 33, relative to vertical axis 35, etc.).

Figure 13:
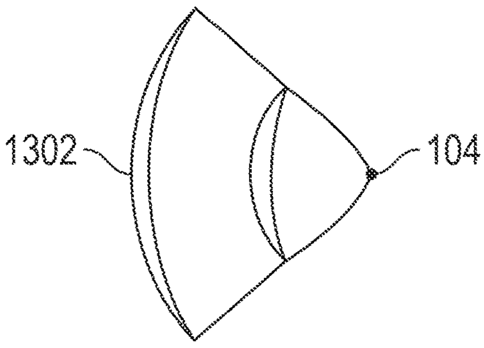
FIG. 13 is a side view of ultrasonic waves emitted by the proximity sensor of FIGS. 11-12, according to an exemplary embodiment.
Figure 14:
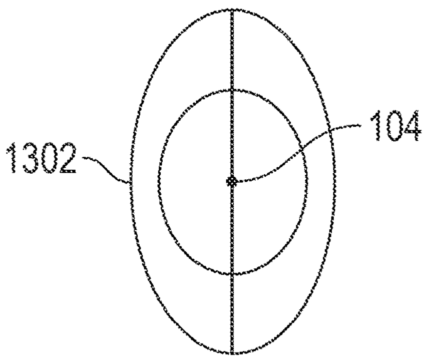
FIG. 14 is a front view of the ultrasonic waves emitted by the proximity sensor of FIGS. 11-12, according to an exemplary embodiment.

Referring now to FIGS. 13-14, the ultrasonic sensor 104 can emit ultrasonic waves 1302. The ultrasonic waves 1302 emitted by the ultrasonic sensor 104 may have an overall conical shape. As the ultrasonic waves 1302 travel further distances from the ultrasonic sensor 104, the diameter of the conical shape increases. The conical shape of the ultrasonic waves 1302 may be a smooth conical shape. The conical shape of the ultrasonic waves 1302 may have an overall circular cross-sectional shape. In some embodiments, the conical shape of the ultrasonic waves 1302 has an elliptical cross-sectional shape.

Platform

Figure 8:
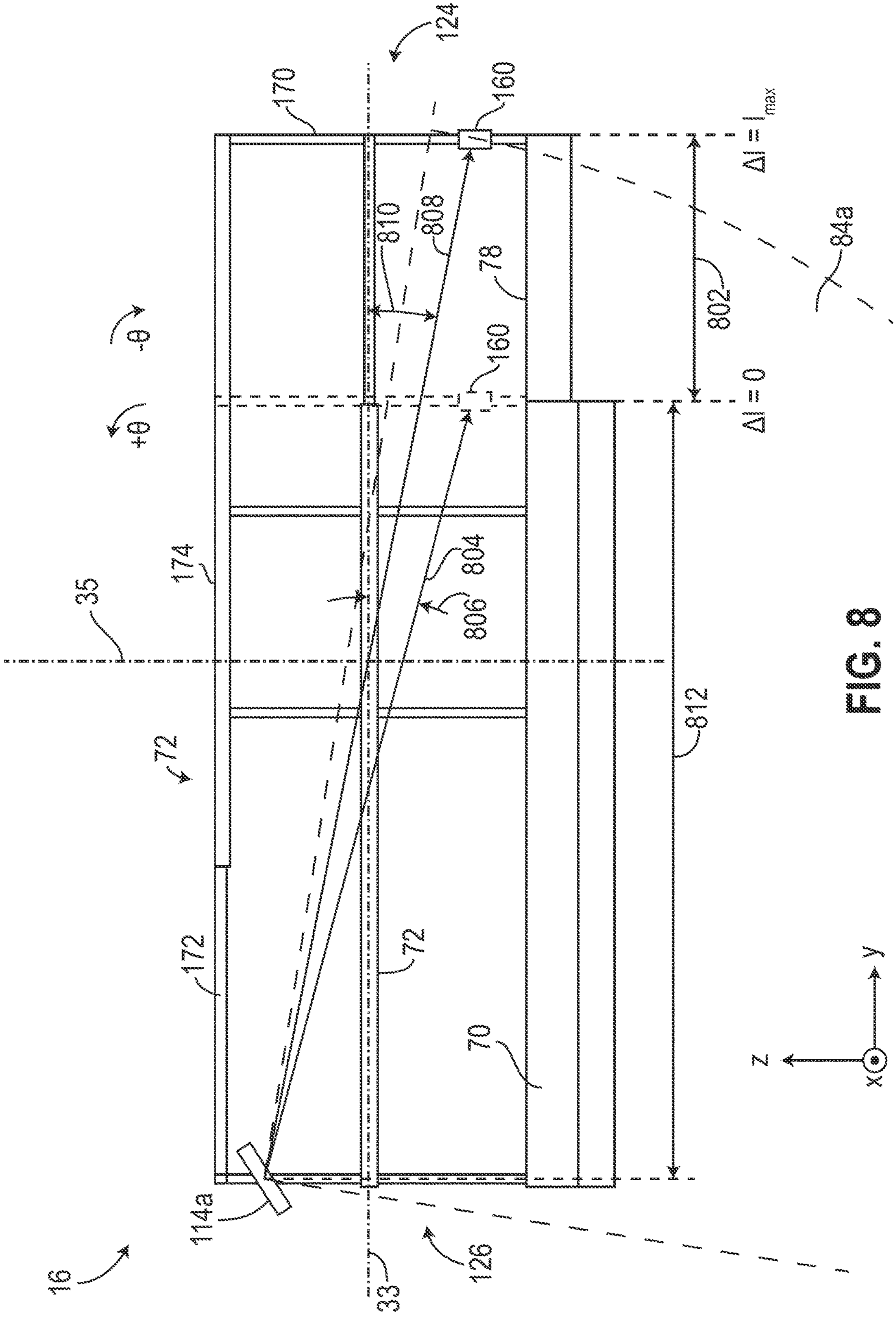
FIG. 8 is a side view of the platform of the lift device of FIG. 5, showing an extendable deck in an extended position, according to an exemplary embodiment.
Figure 9:
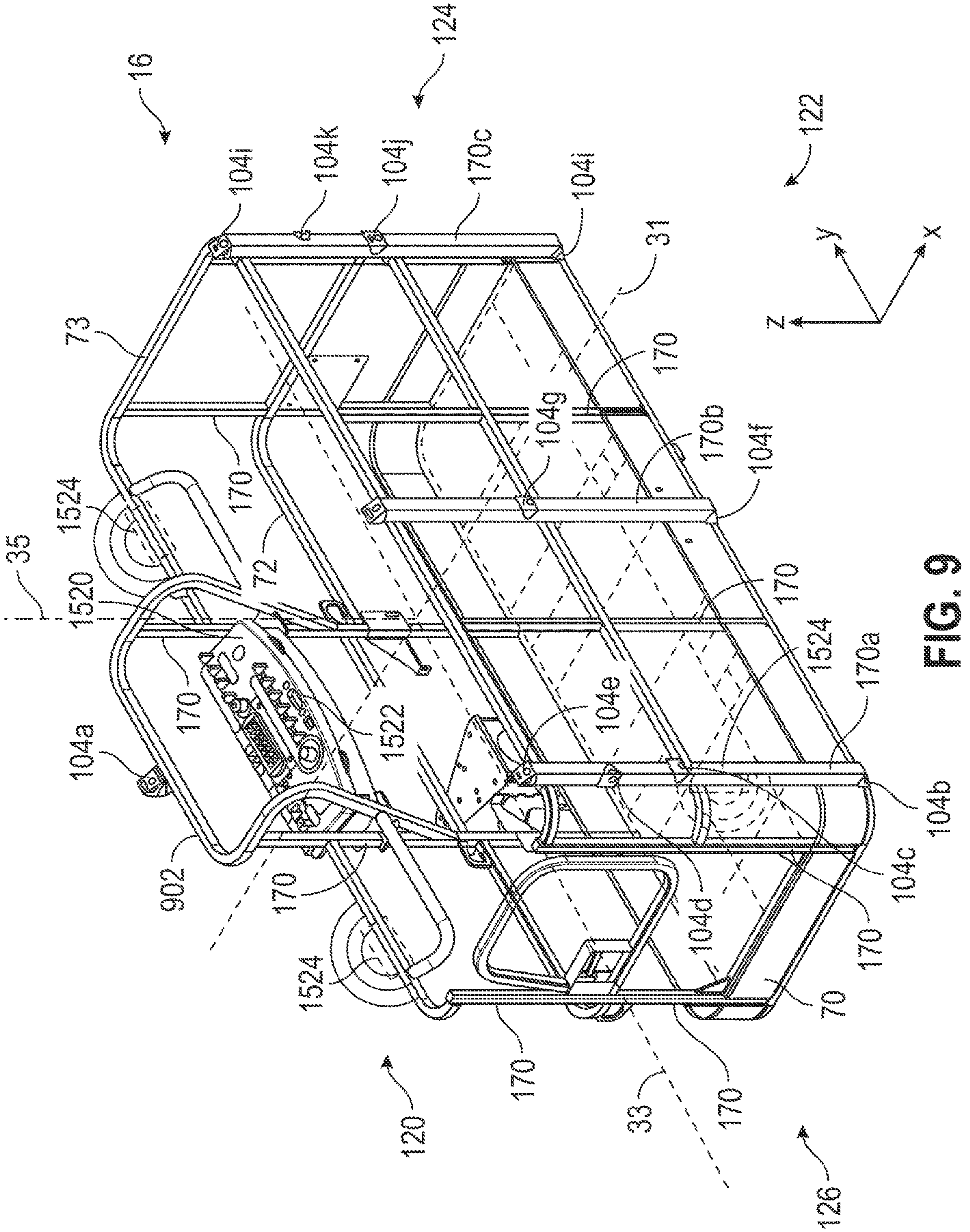
FIG. 9 is a perspective view of a platform of the lift device of FIG. 1, according to another exemplary embodiment.

Referring now to FIG. 9, the platform 16 is shown according to another embodiment. The platform 16 as shown in FIG. 9 may share any of the features of the platform 16 as shown in FIGS. 1-8 and described in greater detail above. However, the platform 16 as shown in FIG. 9 includes ultrasonic sensors 104 in different positions and orientations.

The platform 16 includes twelve ultrasonic sensors positioned about various members of the platform 16. The platform 16 includes a rail, tubular member, pipe, handle, etc., shown as guard rail 902. The guard rail 902 extends along a portion of a perimeter of a human machine interface (HMI) (e.g., a user interface, a control panel, an operator station, etc.), shown as HMI 1520. The guard rail 902 is extends above the HMI 1520 and can be grasped by a user when the lift assembly 14 is extending or retracting. The guard rail 902 includes an ultrasonic sensor 104*a* mounted to an upper portion of the guard rail 902 and directed inwards towards an area where a user stands to operate the HMI 1520. The ultrasonic sensor 104*a* can be configured to detect if a user is leaning over the guard rail 902. Advantageously, the object detection system 100 can use the detection of the user to restrict operation of the lift device 10. For example, if the ultrasonic sensor 104*a* detects that the user (e.g., the operator) is leaning over the guard rail 902, the object detection system 100 can prevent operation of the lift device 10.

Referring still to FIG. 9, the platform 16 includes vertical rails 170 disposed along substantially an entire perimeter of the platform 16. The platform 16 includes vertical rail 170*a*, vertical rail 170*b*, and vertical rail 170*c* spaced apart along the second longitudinal end 122 of the perimeter of the platform 16. The vertical rail 170*a* and the vertical rail 170*c* may be symmetric about the x-z plane (e.g., a plane defined by the vertical axis 35 and the lateral axis 31) such that whatever is said of the vertical rail 170*a* may be said of the vertical rail 170*c*.

The vertical rail 170*a* is positioned on the second longitudinal end 122 at the second lateral end 126. Likewise, the vertical rail 170*c* is positioned on the second longitudinal end 122 at the first lateral end 124. The vertical rail 170 includes ultrasonic sensor 104*b*, ultrasonic sensor 104*c*, ultrasonic sensor 104*d*, and ultrasonic sensor 104*e*. The ultrasonic sensor 105*b* and the ultrasonic sensor 104*e* are positioned at opposite ends of the vertical rail 170*a*. The ultrasonic sensor 104*e* points outwards from the platform 16 and at least partially upwards. The ultrasonic sensor 104*e* points in a direction at least partially along the lateral axis 31 (e.g., the negative x direction) and at least partially along the vertical axis 35. Specifically, the ultrasonic sensor 104*e* points in a direction parallel with a plane defined by the vertical axis 35 and the lateral axis 31 (e.g., the x-z plane).

The ultrasonic sensor 104*b* may be oriented similarly to the ultrasonic sensor 104*e*, but rather than pointing upwards from the platform 16, the ultrasonic sensor 104*b* points downwards (e.g., at least partially in the negative z-direction). The ultrasonic sensor 104*b* points in a direction that is co-planar with the direction that the ultrasonic sensor 104*e* points. An angle defined between the lateral axis 31 and a centerline extending outwards from the ultrasonic sensor 104*b* may be substantially equal to (although having an opposite sign) an angle defined between the lateral axis 31 and a centerline extending outwards from the ultrasonic sensor 104*e*.

The vertical rail 170*a* includes ultrasonic sensor 104*c* and ultrasonic sensor 104*d*, according to an exemplary embodiment. The ultrasonic sensor 104*c* is positioned substantially at a midpoint along the length of the vertical rail 170*a*. The ultrasonic sensor 104*c* points in a direction outwards from the platform 16 and substantially along the lateral axis 31. The ultrasonic sensor 104*c* is configured to monitor/detect the presence of objects to the right of the platform (e.g., to monitor/detect the presence and relative distance of objects beyond the second longitudinal end 122 of the platform 16 along the lateral axis 31 or in the negative x-direction).

The ultrasonic sensor 104*d* is positioned along the vertical rail 170*a* substantially at a midpoint between the ultrasonic sensor 104*e* and the ultrasonic sensor 104*c*. The ultrasonic sensor 104*d* points outwards from the platform 16 along the longitudinal axis 33 (e.g., the ultrasonic sensor points in the positive y-direction). The ultrasonic sensor 104*d* is configured to monitor/detect the presence and relative distance of objects behind the platform 16 (e.g., to monitor/detect the presence and relative distance of objects beyond the second lateral end 126 of the platform 16 along the longitudinal axis 33 or in the positive y-direction).

Referring still to FIG. 9, the platform 16 is shown to include the vertical rail 170*b*, according to an exemplary embodiment. The vertical rail 170*b* is positioned along the first longitudinal end 122 of the platform 16 at substantially a longitudinal midpoint of the platform 16. The vertical rail 170*b* is spaced apart equal longitudinal distances from the vertical rail 170*a* and the vertical rail 170*c*.

The vertical rail 170*b* includes ultrasonic sensor 104*h*, ultrasonic sensor 104*g*, and ultrasonic sensor 104*f*, according to an exemplary embodiment. The ultrasonic sensor 104*h* may be oriented similarly to the ultrasonic sensor 104*e*. The ultrasonic sensor 104*g* is oriented similarly to the ultrasonic sensor 104*c*. The ultrasonic sensor 104*f* is oriented similarly to the ultrasonic sensor 104*b*.

Referring still to FIG. 9, the platform 16 includes vertical rail 170*c*. The vertical rail 170*c* may be symmetric to the vertical rail 170*a* but is positioned along the second longitudinal end 122 at the first lateral end 124 of the platform 16, such that whatever is said of the vertical rail 170*a* can be said of the vertical rail 170*c*. The vertical rail 170*c* includes ultrasonic sensor 104*l*, ultrasonic sensor 104*k*, ultrasonic sensor 104*j*, and ultrasonic sensor 104*i*. The ultrasonic sensor 104*l* may be oriented similarly to the ultrasonic sensor 104*e*. The ultrasonic sensor 104*k* may be oriented similarly to the ultrasonic sensor 104*d* but pointing in an opposite direction (e.g., in the negative y-direction). The ultrasonic sensor 104*j* may be oriented similarly to the ultrasonic sensor 104*c*. The ultrasonic sensor 104*i* may be oriented similarly to the ultrasonic sensor 104*b*. The ultrasonic sensor 104*l* is positioned at a top end of the vertical rail 170*c*. the ultrasonic sensor 104*i* is positioned at a bottom end of the vertical rail 170*c* (e.g., an end of the vertical rail 170*c* opposite to the end at which the ultrasonic sensor 104*l* is positioned). The ultrasonic sensor 104*j* is positioned at a midpoint along the length of the vertical rail 170*c*. The ultrasonic sensor 104*k* is positioned at equal distances between the ultrasonic sensor 104*l* and the ultrasonic sensor 104*j* along the vertical axis 35.

Referring still to FIG. 9, the platform 16 includes one or more visual alert devices 1522 and one or more aural alert devices 1524, according to an exemplary embodiment. The visual alert devices 1522 may be any light emitting device, screen, LEDs, etc., configured to provide a visual alert to a user. The aural alert devices 1524 can be any speaker, buzzer, alarm, etc., or any other device configured to provide an aural/auditory alert to a user. The visual alert devices 1522 may be positioned at the HMI 1520. The aural alert devices 1524 may be positioned anywhere about the platform 16. For example, the aural alert devices 1524 may be positioned at any of the vertical rails 170, the upper most guard rail 73, any of the guard rails 72, at the deck 70, etc. In other embodiments, one or more of the aural alert devices 1524 are positioned at the HMI 1520. The visual alert devices 1522 and the aural alert devices 1524 may be referred to as alert system 1516.

Figure 10:
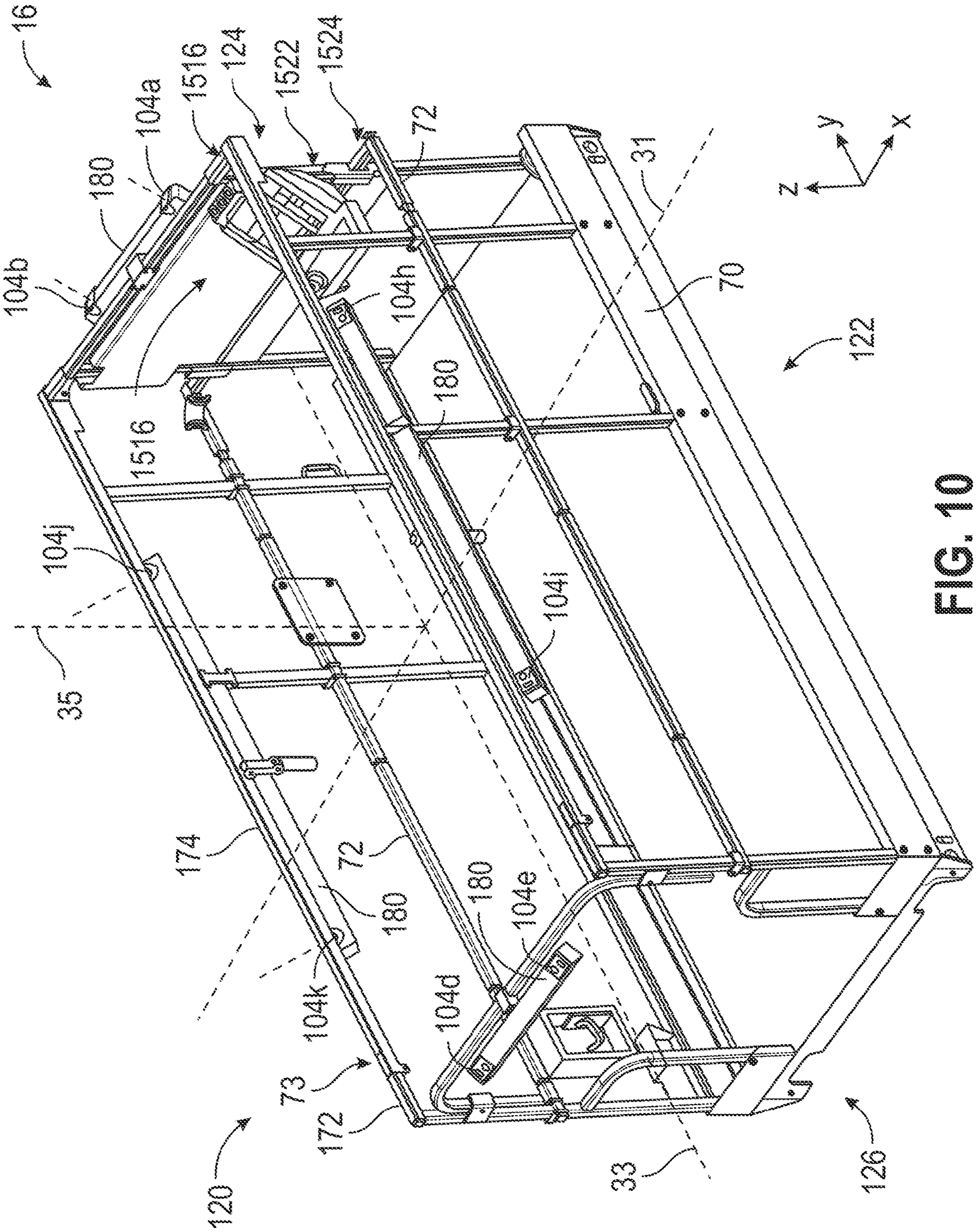
FIG. 10 is a perspective view of a platform of the lift device of FIG. 1, according to another exemplary embodiment.

Referring now to FIG. 10, the platform 16 is shown according to another embodiment. The platform 16 as shown in FIG. 10 may be the same as or similar to the platform 16 as shown in FIGS. 2-8. For example, the platform 16 includes ultrasonic sensor 104*a* and ultrasonic sensor 104*b* positioned at the first lateral end 124 and mounted to the support member 180. The ultrasonic sensor 104*a* and the ultrasonic sensor 104*b* as shown in FIG. 10 may be the same as or similar to the ultrasonic sensor 104*a* and the ultrasonic sensor 104*b* as shown and described in greater detail above with reference to FIGS. 2-8.

The ultrasonic sensor 104*a* and the ultrasonic sensor 104*b* are mounted (e.g., coupled) to the support member 180 at the first lateral end 124. The support member 180 at the first lateral end 124 is coupled (e.g., connected, coupled, fastened, etc.) to the upper most guard rail 73 of the platform 16. The ultrasonic sensor 104*a* and the ultrasonic sensor 104*b* are positioned at opposite ends of the support member 180. The ultrasonic sensor 104*a* points outwards from the platform 16 in a direction at least partially upwards (e.g., at least partially along the vertical axis 35 or at least partially along the positive z direction) and at least partially along the longitudinal axis 33 (e.g., at least partially in the negative y direction). The ultrasonic sensor 104*a* points in a direction that is substantially parallel to a plane defined by the vertical axis 35 and the longitudinal axis 33 (e.g., the z-y plane). The ultrasonic sensor 104*b* is oriented similarly to the ultrasonic sensor 104*a* but is positioned at the opposite end of the support member 180. The ultrasonic sensor 104*a* and the ultrasonic sensor 104*b* are configured to monitor/detect the presence and relative distance of objects in front of and above the platform 16 (e.g., to monitor/detect the presence and relative distance of objects beyond the first lateral end 124 of the platform along the longitudinal axis 33 and at least partially above the platform 16 along the vertical axis 35).

The platform 16 includes ultrasonic sensor 104*d* and ultrasonic sensor 104*e* coupled to support member 180 at the opposite end of the platform 16 (e.g., at the second lateral end 126 of the platform). The ultrasonic sensor 104*d* and the ultrasonic sensor 104*e* are coupled at opposite ends of the support member 180. The ultrasonic sensor 104*d* and the ultrasonic sensor 104*e* may be symmetric to the ultrasonic sensor 104*b* and the ultrasonic sensor 104*a* about a plane defined by the lateral axis 31 and the vertical axis 35 (e.g., symmetric about the x-y plane). The ultrasonic sensor 104*d* and the ultrasonic sensor 104*e* are configured to monitor/detect the presence and relative distance of objects behind and at least partially above the platform 16 (e.g., to monitor/detect the presence and relative distance of objects beyond the second lateral end 126 along the longitudinal axis 33 and at least partially above the platform 16 along the vertical axis 35).

The platform 16 includes ultrasonic sensor 104*k* and ultrasonic sensor 104*j* coupled to support member 180 at the first longitudinal end 120 of the platform 16. The ultrasonic sensor 104*k* and the ultrasonic sensor 104*j* point in a direction outwards from the platform 16, at least partially along the lateral axis 31 (e.g., at least partially in the positive x direction), and at least partially along the vertical axis 35 (e.g., at least partially in the positive z direction). The ultrasonic sensor 104*k* and the ultrasonic sensor 104*j* may both point in directions that are substantially parallel to a plane defined by the vertical axis 35 and the lateral axis 31 (e.g., the x-z plane). The ultrasonic senor 104*k* and the ultrasonic sensor 104*j* are positioned at opposite ends of the support member 180. The ultrasonic sensor 104*k* and the ultrasonic sensor 104*j* are configured to monitor/detect the presence and relative distance of objects to the right of and at least partially above the platform 16 (e.g., to monitor/detect the presence and relative distance of objects beyond the first longitudinal end 120 of the platform 16 in a direction at least partially along the lateral axis 31 (e.g., the positive x-direction) and at least partially above the platform 16 along the vertical axis 35 (e.g., the positive z-direction)).

The platform 16 includes ultrasonic sensor 104*i* and ultrasonic sensor 104*h* coupled to support member 180 at the second longitudinal end 122 of the platform 16. The ultrasonic sensor 104*i* and the ultrasonic sensor 104*h* may be symmetric and similar to the ultrasonic sensor 104*k* and the ultrasonic sensor 104*j* about a plane defined by the vertical axis 35 and the longitudinal axis 33 (e.g., symmetric about the z-y plane). The ultrasonic sensor 104*i* and the ultrasonic sensor 104*h* are configured to monitor/detect the presence and relative distance of objects beyond the second longitudinal end 122 along the lateral axis 31 (e.g., objects beyond the platform 16 in the negative x direction) and at least partially above the platform 16 along the vertical axis 35 (e.g., objects above the platform 16 in the positive z direction).

Referring still to FIG. 10, the platform 16 includes HMI 1520, according to an exemplary embodiment. The HMI 1520 is configured to receive a user input to extend or retract the lift assembly 14 and/or the drive and steer the lift device 10. The HMI 1520 may include any buttons, levers, user input devices, switches, etc., configured to receive a user input. The HMI 1520 may include the alert system 1516. The HMI 1520 may include one or more of the aural alert devices 1524 and/or one or more of the visual alert devices 1522 configured to provide at least one of a visual alert and an aural alert to the user (e.g., the operator).

Extendable Deck

Referring to FIG. 8, the lidar sensor 114*a* (and/or the lidar sensor 114*b*) can be configured to monitor a degree of extension of the extendable deck 78, according to an exemplary embodiment. If the protrusion 160 is within the scan area 84*a* of the lidar sensor 114*a* when the extendable deck 78 is in the fully retracted position (as represented by the dashed lines) and when the extendable deck 78 is in the fully extended position (as represented by the solid lines), the lidar sensor 114*a* can monitor a position of the protrusion 160 that can be used to determine a degree of extension (i.e., distance 802) of the extendable deck 78. The distance 802 is an amount of extension of the extendable deck 78 and may be referred to as variable $\Delta l$. If $\Delta l=0$, the extendable deck 78 is fully retracted. If $\Delta l=l_{max}$, the extendable deck 78 is fully extended. The lidar sensor 114*a* can monitor a current position (e.g., z-y coordinates or polar coordinates) of the protrusion 160. For example, when the extendable deck 78 is fully retracted (i.e., $\Delta l=0$), the protrusion 160 is a distance 804 from the lidar sensor 114*a* at an angle 806 (relative to the longitudinal axis 33). The distance 804 may be referred to as variable $r_{retracted}$ and the angle 806 may be referred to as $\theta_{retracted}$. In some embodiments, the controller 1500 stores the values of $r_{retracted}$ and $\theta_{retracted}$ (i.e., the polar coordinates of the protrusion 160 when the extendable deck 78 is fully retracted) and/or values of $y_{retracted}$ and $z_{retracted}$ (i.e. the Cartesian coordinates of the protrusion 160 when the extendable deck 78 is fully retracted), where $y_{retracted}=r_{retracted}\cos(\theta_{retracted})$ and $z_{retracted}=r_{retracted}\sin(\theta_{retracted})$. The controller 1500 can compare a currently determined position (e.g., y-z Cartesian coordinates and/or $r\angle\theta$ polar coordinates) of the protrusion 160 to known positions of the protrusion 160 that correspond to the extendable deck 78 being fully extended or fully retracted. The controller 1500 can receive current values of r and θ of the protrusion 160 relative to the lidar sensor 114*a* to determine current y and z coordinates of the protrusion 160.

In other embodiments, the controller 1500 receives the current y and z coordinates of the protrusion 160 from the lidar sensor 114*a*.

The controller 1500 can determine a current value of Δl based on a current y coordinate of the protrusion 160 relative to the lidar sensor 114*a* and a known longitudinal distance 812 between the lidar sensor 114*a* and the protrusion 160 when the extendable deck 78 is in the fully retracted position. The controller 1500 can determine the displacement Δl of the extendable deck 78 using the equation $\Delta l = y - y_{distance}$ where Δl is the distance 802, y is a current longitudinal distance between the lidar sensor 114*a* and the protrusion 160, and $y_{distance}$ is the known longitudinal distance 812 of the protrusion 160 from the lidar sensor 114*a* when the extendable deck 78 is fully retracted, and $0 \leq \Delta l \leq l_{max}$. The controller 1500 can also determine the value of Δl periodically over a time interval Δt to determine a rate of change of extension or retraction of the extendable deck 78. The protrusion 160 may be an additional component (e.g., a bar, a beam, a pipe, an extension, etc.) coupled to any of the extendable deck 78, a vertical rail 170 that moves with the extendable deck 78, the outer member 174 of the upper most guard rail 73, etc., or any other component of the platform 16 that moves with the extendable deck relative to the lidar sensor 114*a*. In other embodiments, the protrusion 160 is a component of the extendable deck 78 such as one of the vertical rails 170, a portion of one of the vertical rails 170, a portion of the extendable deck 78, a portion of the outer member 174 of the upper most guard rail 73, etc. In some embodiments, the "top beam" of the lidar sensor 114*a* monitors the extension of the extendable deck 78.

Advantageously, using the lidar sensor 114*a* to monitor the extension of the extendable deck 78 removes the need to use an extension sensor. The lidar sensor 114*a* can be used for object detection around the platform 16 (e.g., below the platform 16) and also to determine if the extendable deck 78 is fully extended, fully retracted, or at some position between fully extended and fully retracted (e.g., 50% extended, 75% extended, etc.).

Referring again to FIG. 3, the width 142 of any of the stop zones 90, the width 144 of any of the warning zones 93, and/or the width 146 of any of the stop zones 90 can change based on a degree of extension of the lift assembly 14. The degree of extension of the lift assembly 14 may be distance 302 between the bottom of the platform 16 and the top of the frame assembly 12 (e.g., an overall height of the lift assembly 14) or distance 304 between the bottom of the platform 16 and the ground (e.g., an overall height of the lift assembly 14 and the frame assembly 12). As the lift assembly 14 extends (e.g., the platform 16 moves in the positive z direction or moves upwards along the vertical axis 35), the longitudinal width 140 of the lift assembly 14 may decrease (due to a bottom end of the bottom outer member 64 moving along the longitudinal axis 33 in the negative y direction) and an angle 306 defined between the bottom most inner member 62 and the longitudinal axis 33 increases (and an angle 308 defined between the bottom most outer member 64 and the longitudinal axis 33 increases). A lift assembly sensor 115 can be used to measure/monitor/detect/sense any of the longitudinal width 140 of the lift assembly 14 and/or angle 306 (or angle 308). The lift assembly sensor 115 may be a single sensor or a collection of sensors. The lift assembly sensor 115 may be any of or a collection of an angle sensor configured to measure angle 306 and/or angle 308, a proximity sensor configured to measure the longitudinal width 140 of the lift assembly 14, a linear potentiometer configured to measure the longitudinal width 140 of the lift assembly 14, an ultrasonic sensor configured to measure the longitudinal width 140 of the lift assembly 14, an IR sensor configured to measure the longitudinal width 140 of the lift assembly 14, etc., or any other sensor configured to measure the longitudinal width 140 of the lift assembly 14 or the angle 306 or angle 308.

In some embodiments, the controller 1500 uses the measured values of the longitudinal width 140 of the lift assembly 14 and/or the angle 306 (or angle 308) to adjust the stop zone 90 and/or the warning zones 93 and 92. For example, the controller 1500 may use the measured value of the longitudinal width 140 to adjust the longitudinal width 142*a* of the stop zone 90*a* or to adjust the longitudinal width 142*b* of the stop zone 90*b*. For example, as the platform 16 is raised due to the extension of the lift assembly 14 and the longitudinal width 140 of the lift assembly 14 decreases, the longitudinal width 142*a* of the stop zone 90*a* may also decrease. Likewise, the longitudinal width 144*a* of the warning zone 93*a* and the longitudinal width 146*a* of the warning zone 92*a* may decrease as the platform 16 is raised and the longitudinal width 140 of the lift assembly 14 decreases. In other embodiments, as the platform 16 is raised and the longitudinal width 140 of the lift assembly 14 decreases, the longitudinal width 142*a* of the stop zone 90*a* decreases but the longitudinal width 144*a* of the warning zone 93*a* and the longitudinal width 146*a* of the warning zone 92*a* increase or remain constant.

Controller

Figure 15:
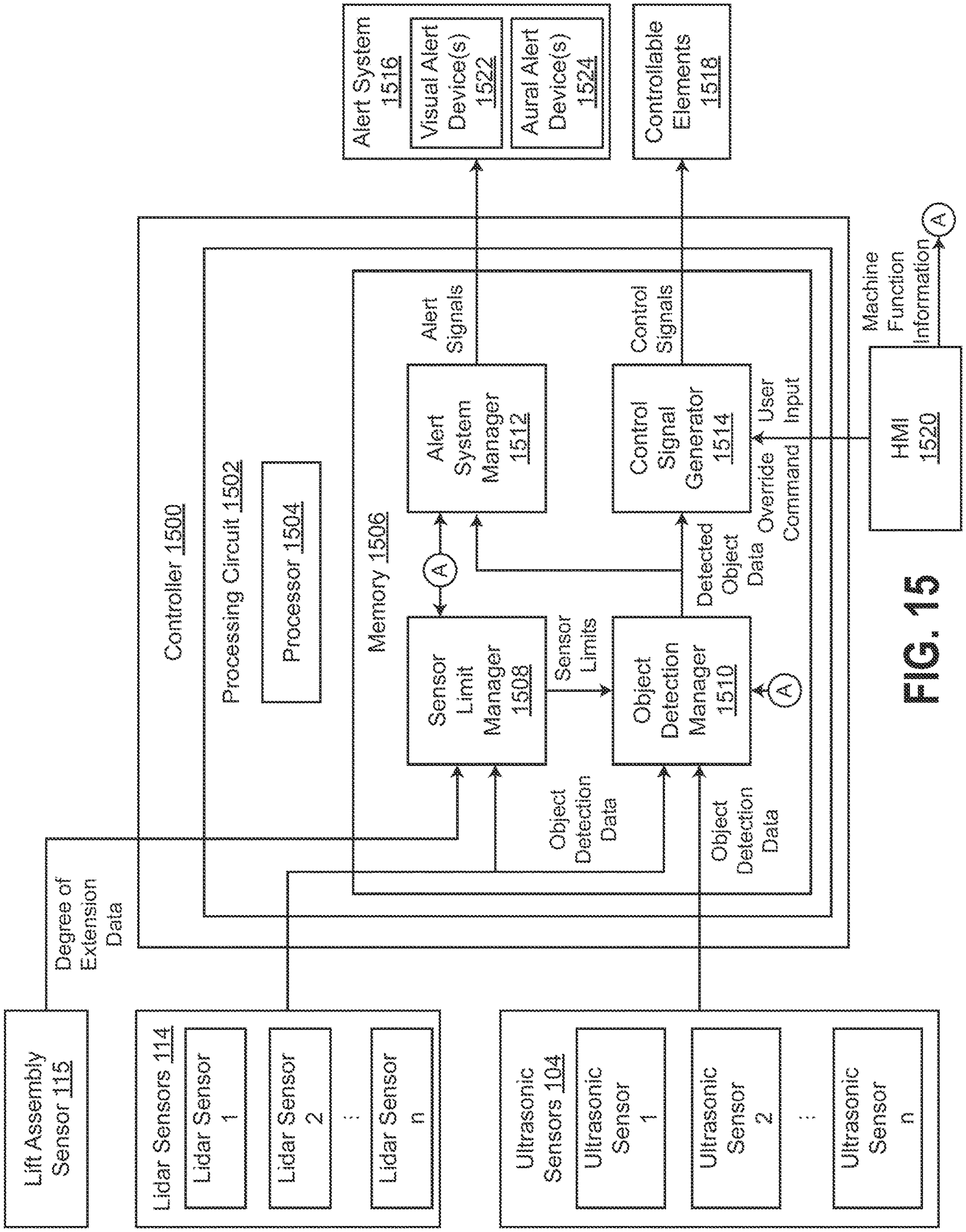
FIG. 15 is a block diagram of a controller of the lift device of FIG. 1, according to an exemplary embodiment.

Referring now to FIG. 15, the controller 1500 is shown in greater detail, according to an exemplary embodiment. The controller 1500 is configured to receive object detection data from any of the lidar sensors 114 and/or object detection data from any of the ultrasonic sensors 104 to determine alerts or determine if certain operations of the lift device 10 should be restricted. The controller 1500 also receives data regarding the amount of extension of the lift assembly 14 (e.g., values of the longitudinal width 140 of the lift assembly 14 and/or values of angle 306 and/or values of angle 308) from the lift assembly sensor 115. The controller 1500 can use the data to determine adjustments to any of the stop zones 90, the warning zones 93, and/or the warning zones 92. For example, the controller 1500 may increase or decrease an overall area of any of the stop zones 90, the warning zones 93, and/or the warning zones 92 based on the degree of extension of the lift assembly 14 (e.g., how elevated the platform 16 is above the ground). The controller 1500 may receive user inputs from the HMI 1520. The user inputs from the HMI 1520 may indicate commands from a user to extend or retract the lift assembly 14 or to drive/steer the lift device 10. The controller 1500 determines if any objects, obstacles, obstructions, etc., are present in any of the stop zones 90, the warning zones 93, and the warning zones 92 based on the object detection data from the lidar sensors 114 and/or the ultrasonic sensors 104. The controller may also determine a relative distance between any objects and the lift device 10 or the platform 16 (e.g., objects above the platform 16, below the platform 16, etc.). Based on whether any objects/obstacles are within the stop zones 90, the warning zones 93, the warning zones 92, or within a certain distance of the platform 16 or the lift device 10, the controller 1500 can restrict one or more operations of the lift device 10 that could cause a collision with the obstacle and/or cause the alert system 1516 to provide an alert (e.g., a visual alert and/or an aural alert) to the operator/user.

The controller 1500 includes a processing circuit 1502, a processor 1504, and memory 1506. The processor 1504 can be a general purpose or specific purpose processor, an application specific integrated circuit (ASIC), one or more field programmable gate arrays (FPGAs), a group of processing components, or other suitable processing components. The processor 1504 is configured to execute computer code or instructions stored in the memory 1506 or received from other computer readable media (e.g., CDROM, network storage, a remote server, etc.), according to some embodiments.

The memory 1506 can include one or more devices (e.g., memory units, memory devices, storage devices, etc.) for storing data and/or computer code for completing and/or facilitating the various processes described in the present disclosure. The memory 1506 can include random access memory (RAM), read-only memory (ROM), hard drive storage, temporary storage, non-volatile memory, flash memory, optical memory, or any other suitable memory for storing software objects and/or computer instructions. The memory 1506 can include database components, object code components, script components, or any other type of information structure for supporting the various activities and information structures described in the present disclosure. The memory 1506 can be communicably connected to the processor 1504 via the processing circuit 1502 and can include computer code for executing (e.g., by the processor 1504) one or more processes described herein.

The controller 1500 may a communications interface (not shown), according to some embodiments. The communications interface can include any number of jacks, wire terminals, wire ports, wireless antennas, or other communications interfaces for communicating information (e.g., sensory information) and/or control signals (e.g., control signals for controllable elements 1518, alert signals for alert system 1516, etc.). The communications interface facilitates a communicable connection between the controller 1500 and any of the lidar sensors 114, the ultrasonic sensors 104, the lift assembly sensor 115, the HMI 1520, the alert system 1516, the controllable elements 1518, etc., or any other sensors, systems, controllers and/or controllable elements of the lift device 10). For example, the communications interface can be configured to receive an analog or a digital signal of the sensory information from the lift assembly sensor 115, the lidar sensors 114, the ultrasonic sensors 104, etc. In some embodiments, the communications interface is configured to receive a user input from the HMI 1520. The communications interface can be a digital output (e.g., an optical digital interface) configured to provide a digital control signal to the controllable elements 1518 and/or the alert system 1516. In other embodiments, the communications interface is configured to provide an analog output signal to the alert system 1516 and/or the controllable elements 1518. In some embodiments, the communications interface is configured to provide display signals to HMI 1520 to display an indication of a detected object in any of the warning zones 92, the warning zones 93, and the stop zones 90.

Referring still to FIG. 15, the memory 1506 includes a sensor limit manager 1508, and an object detection manager 1510, according to some embodiments. The sensor limit manager 1508 is configured to receive the object detection data from any of the lidar sensors 114 and/or any of the ultrasonic sensors 104 as well as the data from the lift assembly sensor 115 indicating a degree of extension of the lift assembly 14 (and thereby an elevation of the platform 16 relative to the ground). The sensor limit manager 1508 can use the object detection data and/or the data from the lift assembly sensor 115 indicating the degree of extension of the lift assembly 14 to determine sensor limits. The sensor limit manager 1508 provides the sensor limits to the object detection manager 1510. The sensor limits may include definitions of the stop zones 90, the warning zones 92, the warning zones 93, etc. The sensor limit manager 1508 may determine an increase or a decrease in an overall area of any of the stop zones 90, the warning zones 92, and the warning zones 93 based on the data received from the lift assembly sensor 115 indicating the degree of extension of the lift assembly 14. In some embodiments, the sensor limit manager 1508 decreases the longitudinal width **142*a* of the stop zone 90*a* of the lidar sensor 114*a* and decreases the longitudinal width 142*b* of the stop zone 90*b* of the lidar sensor 114*b* in response to receiving data from the lift assembly sensor 115 indicating that the lift assembly 14 has been extended by some amount. In some embodiments, the sensor limit manager 1508 increases the longitudinal width 142*a* of the stop zone 90*a* of the lidar sensor 114*a* and increases the longitudinal width 142*b* of the stop zone 90*b* of the lidar sensor 114*b* in response to receiving data from the lift assembly sensor 115 indicating that the lift assembly 14** has been retracted by some amount.

The sensor limit manager 1508 can also provide the object detection manager 1510 with sensor limits for the ultrasonic sensors 104. For example, the sensor limit manager 1508 may provide the object detection manager 1510 with various sensor limits of each of the one or more ultrasonic sensors 104 indicating a warning zone and a stop zone. The sensor limits of the ultrasonic sensors 104 provided to the object detection manager 1510 by the sensor limit manager 1508 can define a minimum allowable distance between an object and any of the ultrasonic sensors 104. The minimum allowable distance may be a closest allowable distance between the platform 16 and the obstacle before the platform 16 is restricted from operating in a direction (e.g., extending) that would cause a collision. For example, the sensor limit manager 1508 may provide the object detection manager 1510 with a minimum allowable distance of 6 feet for one or more of the ultrasonic sensors 104, indicating that if any of the one or more ultrasonic sensors 104 detect that an object is 6 feet (or less) away from the platform 16, the platform 16 should not be allowed to be extended. In other embodiments, the sensor limit manager 1508 provides the object detection manager 1510 with a warning range, and the minimum allowable distance for any of the ultrasonic sensors 104. The warning range can indicate that if an object is detected by any of the ultrasonic sensors 104 within the warning range (e.g., between 6 and 10 feet away from the platform 16), an alert/alarm should be provided to the user. It should be understood that the warning range and the minimum allowable distance for the ultrasonic sensors 104 may be the same for each, or may vary based on the orientation and placement of the ultrasonic sensor 104. For example, one or more of the ultrasonic sensors 104 may have a first warning range and a first minimum allowable distance, while another one or more of the ultrasonic sensors may have a second warning range and a second minimum allowable distance. The sensor limit manager 1508 can determine any of the sensor limits based on known orientations and positions of each of the ultrasonic sensors 104 and/or the lidar sensors 114.

The controller 1500 can also be configured to receive machine function information from the HMI 1520. In other embodiments, the controller 1500 is configured to receive sensory information (e.g., from a GPS, a speed sensor, extension sensors, various feedback sensors, etc.) that indicate the machine function information. The machine function information can indicate any currently performed operations of the lift device 10. For example, the machine function information may indicate a direction of travel of the lift device 10, whether the lift assembly 14 is being raised or lowered, a direction of travel of the platform 16, etc. The sensor limit manager 1508 and/or the object detection manager 1510 can use the machine function information to perform their respective functions. For example, the sensor limit manager 1508 may adjust or define the sensor limits based on the machine function information. According to one example, the sensor limit manager 1508 may adjust the warning zone and/or the stop zone based on the machine function information. For example, the sensor limit manager 1508 may increase a size of the warning zone and/or the stop zone that is in front of the lift device 10 if the machine function information indicates that the lift device 10 is driving forwards.

The object detection manager 1510 can be similarly configured to receive and use the machine function information. In some embodiments, the object detection manager 1510 uses the machine function information to determine which of the ultrasonic sensors 104 and the lidar sensors 114 should be monitored/evaluated. For example, if the machine function information indicates that the lift device 10 is travelling forwards, the object detection manager 1510 may monitor and/or evaluate the object detection data received form the ultrasonic sensors 104 and the lidar sensors 114 that are oriented forwards. In this way, the object detection manager 1510 may use the machine function information to identify which of the ultrasonic sensors 104 and/or the lidar sensors 114 are relevant to object detection given the operation of the lift device 10.

In other embodiments, one of the lidar sensors 114 points downwards and is configured to measure a distance between the bottom of the platform 16 and the ground surface or the top of the frame assembly 12. In this case, the sensor limit manager 1508 can use the distance measured by the lidar sensor 114 to determine adjustments to the stop zones 90, the warning zones 92, and/or the warning zones 93.

The object detection manager 1510 is configured to receive the sensor limits from the sensor limit manager 1508 and the object detection data from the lidar sensors 114 and the ultrasonic sensors 104. The object detection manager 1510 uses the sensor limits and the object detection data to determine if any objects are within any of the stop zones 90, the warning zones 92, and/or the warning zones 93. The object detection manager 1510 is configured to output detected object data. The object detection data indicates whether or not an object is present in any of the stop zones 90, the warning zones 93, the warning zones 92, as well as a position, shape, size, etc., of the detected objects. The object detection manager 1510 can also determine if an object is within the warning range of the ultrasonic sensors 104 or if an object is at the minimum allowable distance relative to any of the ultrasonic sensors 104.

The memory 1506 also includes an alert system manager 1512. The alert system manager 1512 is configured to receive the detected object data from the object detection manager 1510 and provide alert signals to alert system 1516. The alert system manager 1512 receives the detected object data, and depending on whether or not the detected object data indicates the presence of an object within the stop zones 90, the warning zones 92, and the warning zones 93, outputs alert signals to the alert system 1516. For example, the alert system manager 1512 may receive the detected object data from the object detection manager 1510 indicating that an object is present within one of the warning zones 92. In response to receiving an indication that an object is within one of the warning zones 92, the alert system manager 1512 outputs alert signals to the alert system 1516 to cause the alert system 1516 to provide an appropriate alert to the operator. For example, in the case when an object is detected within one of the stop zones 90, the alert system manager 1512 may output alert signals to the alert system 1516 to cause the visual alert devices 1522 to provide a visual alert to the operator (e.g., a flashing light, a steady red light, etc.) and to cause the aural alert device(s) 1524 to provide an aural alert to the operator (e.g., a siren, intermittent beeping, a warning voice, etc.).

The alert system manager 1512 can cause the alert system 1516 to provide different alerts based on if an object is detected within one of the warning zones 92 or one of the warning zones 93, or if the object is detected within one of the stop zones 90. For example, if an object is detected within one of the warning zones 93 or one of the warning zones 92 (or a certain warning zone 93 or a certain warning zone 92), the alert system manager 1512 may cause the alert system 1516 to provide only a visual alert to the user via the visual alert devices 1522. However, if an object is detected at one of the stop zones 90, the alert system manager 1512 may cause the alert system 1516 to provide both a visual alert and an aural alert to the user via the visual alert device(s) 1522 and the aural alert device(s) 1524. In other embodiments, the alert system manager 1512 causes the alert system 1516 to provide different alerts based on a proximity between the detected object and any of the stop zones 90 (or between the detected object and the lift device 10). For example, the alert system manager 1512 may cause the alert system 1516 to provide only a visual alert via the visual alert device(s) 1522 is the detected object is at an outer bounds of the warning zones 93 or the warning zones 92, and both a visual and an aural alert if the detected object is near one of the stop zones 90 but within one of the warning zones 93 and/or one of the warning zones 92.

The alert system manager 1512 can also be configured to cause the alert system 1516 to display an approximate location of the detected object. For example, if an object is detected below the platform 16, the alert system manager 1512 may cause the alert system 1516 to display a visual alert (e.g., a message, a notification, a particular pattern of lights, etc.) indicating the that an object is below the platform. The alert system manager 1512 can also be configured to cause the alert system 1516 to display (via the visual alert device(s) and/or the aural alert device(s) 1524) an approximate distance between the detected object and the lift device 10 (e.g., a notification such as "WARNING: OBJECT WITHIN 20 FEET").

In some embodiments, the alert system 1516 is integrated with the HMI 1520. For example, the HMI 1520 may include any or all of the visual alert device(s) 1522 (e.g., a screen, a display device, a user interface, etc.) or any or all of the aural alert device(s) 1518 (e.g., speakers, alarms, buzzers, etc.).

The alert system 1516 can also operate the visual alert device(s) 1522 and/or the aural alert device(s) 1524 to provide a directional alert. For example, some of the visual alert device(s) 1522 and/or the aural alert device(s) 1524 may be positioned at a front end of the lift device 10 (e.g., at a front end of the platform 16, first lateral end 124, etc.) while others of the visual alert device(s) 1522 and/or the aural alert device(s) 1524 are positioned at a rear end (e.g., second lateral end 126) of the lift device 10 (e.g., at the rear end of the platform 16). The controller 1500 can operate the visual alert device(s) 1522 and/or the aural alert device(s) 1524 to provide the directional alert. For example, if an object or obstacle is detected in a warning zone in front of the lift device 10, the controller 1500 (e.g., the alert system manager 1512) may operate the visual alert device(s) 1522 and/or the aural alert device(s) 1524 that are at the front end of the lift device 10 to provide a visual alert and/or an aural alert. Likewise, if the controller 1500 detects that an obstacle is rearwards of the lift device 10, the alert system manager 1512 may operate the visual alert device(s) 1522 and/or the aural alert device(s) 1524 at the rear end of the lift device 10 to provide their respective visual and/or aural alerts. The alert system manager 1512 may also use the machine function information to determine which of the visual alert device(s) 1522 and/or the aural alert device(s) 1524 should be operated. For example, if the machine function information indicates that the lift device 10 is travelling forwards and the controller 1500 determines that an object is present in the warning zone and/or the stop zone in front of the lift device 10, the alert system manager 1512 may operate the visual alert device(s) 1522 and/or the aural alert device(s) 1524 that are at the front end of the lift device 10 to provide their respective visual and/or aural alerts.

The memory 1506 includes a control signal generator 1514. The control signal generator 1514 is configured to receive the detected object data from the object detection manager 1510 as well as a user input from the HMI 1520. The control signal generator 1514 can also receive user inputs or information from a sensor or the primary driver 44 indicating a direction and speed of travel of the lift device 10 (e.g., 5 mph in the forward/positive y direction). The user input received from the HMI 1520 may be any of a command from the operator to extend the lift assembly 14 (e.g., raise the platform 16), retract the lift assembly 14 (e.g., lower the platform 16), drive the lift device 10 (e.g., along the longitudinal axis 33 in either direction), steer the lift device 10 (e.g., rotate the tractive assemblies 40), etc. The control signal generator 1514 is configured to receive the user inputs from the HMI 1520 and generate control signals for controllable elements 1518 of the lift device 10. The controllable elements 1518 may be any components of the lift device 10 that cause the lift device 10 to operate (e.g., that cause the lift assembly 14 to extend, retract, etc.). For example, the controllable elements 1518 may include any of the lift actuators 66, the primary driver 44, the pump 46, motors, engines, hydraulic valves, etc., of the lift device 10.

The control signal generator 1514 can restrict the operation of one or more of the controllable elements 1518 based on the detected object data received from the object detection manager 1510. For example, if the detected object data indicates that an object is detected within one of the stop zones 90, the control signal generator 1514 may restrict the lift device 10 from driving in the direction of the object. In another example, if an object is detected below the platform 16, the control signal generator 1514 may restrict the lift assembly 14 from being retracted (e.g., restrict the platform 16 from being lowered). In yet another example, if an object is detected above the platform 16 and is substantially at the minimum allowable distance relative to one of the ultrasonic sensors 104, the control signal generator 1514 may restrict extension of the lift assembly 14 (e.g., restrict the platform 16 from being raised/elevated).

The control signal generator 1514 can also be configured to restrict additional user inputs from being provided to the controllable elements 1518 if the user input would cause the lift device 10 to move or extend in a direction towards a detected obstacle. In some embodiments, the control signal generator 1514 only restricts additional user inputs if the detected object is at the minimum allowable distance relative to one of the ultrasonic sensors 104 or the detected object is at the transition between one of the stop zones 90 and one of the warning zones 92/93 and the user input would cause the detected object to be within one of the stop zones 90 or within the minimum allowable distance relative to one of the ultrasonic sensors 104. However, the control signal generator 1514 may still generate and send control signals to the controllable elements 1518 if the user input would cause the platform 16 and/or the lift device 10 to move away from the detected object.

The control signal generator 1514 can also use the direction of travel of the lift device 10 to determine if an alert should be provided to the user. For example, if an object is detected by ultrasonic sensor **104*a* in front of the lift device 10 (e.g., in front of the platform 16), but the direction of travel of the lift device 10 is in an opposite direction (e.g., away from the object such that the distance between the object and the lift device 10 is increasing), the control signal generator 1514 may determine that an alert should not be provided to the user. In another example, if the lift device 10 is travelling towards an obstacle (e.g., an obstacle is detected by ultrasonic sensor 104*a* in front of the lift device 10 and the lift device 10 is travelling in the forwards/positive y direction), the control signal generator 1514 may provide alert system manager 1512 with an indication that an alert should be provided to the user via the alert system 1516**.

In some embodiments, the control signal generator 1514 ceases restricting certain user inputs (as described in greater detail above) in response to receiving an override command from the HMI 1520.

The object detection manager 1510 can be configured to monitor the extension of the extendable deck 78 using any of the techniques, methods, and functionality as described in greater detail above with reference to FIG. 8. For example, the object detection manager 1510 can receive the information from the lidar sensor **114*a* to determine the distance 802 (i.e., $\Delta l$). The object detection manager 1510 can provide the value of $\Delta l$ to the control signal generator 1514**.

The control signal generator 1514 receives the value of $\Delta l$ and determines if the extendable deck 78 is extended (i.e., if $\Delta l=0$). If the extendable deck 78 is extended, the control signal generator 1514 may restrict one or more operations of the lift device 10. For example, if $\Delta l>0$, the control signal generator 1514 may restrict any of the extension of the lift assembly 14 (e.g., restrict the platform 16 from being elevated), the retraction of the lift assembly 14 (e.g., restrict the platform 16 from moving towards the ground), driving/steering of the lift device 10 (e.g., restrict the primary driver from causing the tractive assemblies 40 to rotate), until the extendable deck 78 is not extended (i.e., $\Delta l$ is substantially equal to zero).

Alert Process

Figure 16:
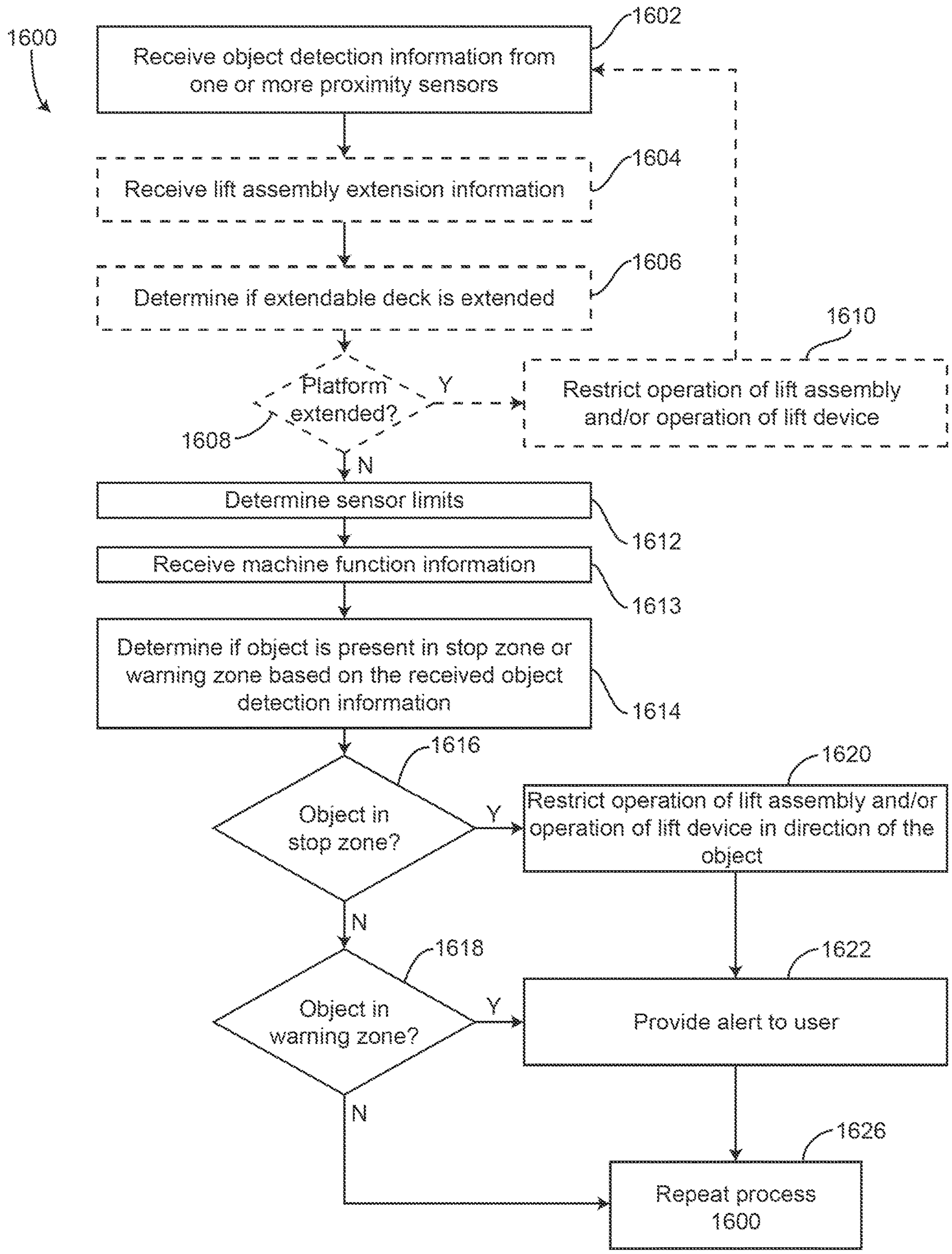
FIG. 16 is a block diagram of a process performed by the controller of FIG. 15 to detect objects and provide an alert to a user, according to an exemplary embodiment.

Referring now to FIG. 16, a process 1600 for detecting objects and alerting an operator of the detected object(s) is shown, according to an exemplary embodiment. Process 1600 includes steps 1602-1626. Process 1600 may be repeated throughout operation of the lift device 10.

Process 1600 includes receiving object detection information from one or more proximity sensors (step 1602). The one or more proximity sensors may be any of lidar sensors (e.g., lidar sensors 114), ultrasonic sensors (e.g., ultrasonic sensors 104), radar detection devices, laser rangefinders, sonar detection devices, etc., or any other proximity sensors positioned about the lift device 10. Step 1602 can be performed by the controller 1500 or any other computing device of the lift device 10.

Process 1600 includes receiving lift assembly extension information (step 1604). The lift assembly extension information may be received from one of the lidar sensors 114 (e.g., the lidar sensor 114*a*) and can indicate a distance between the lidar sensor 114 and a portion of the extendable deck 78 (e.g., protrusion 160) that moves relative to the lidar sensor 114 with extension of the extendable deck 78. Step 1604 may be performed by controller 1500. Specifically, step 1604 may be performed by the object detection manager 1510 of the controller 1500.

Process 1600 includes determining whether or not the extendable deck 78 is extended (steps 1606 and 1608). Determining whether or not the extendable deck 78 is extended can include determining whether or not the extendable deck 78 is fully retracted (i.e., $\Delta l=0$), if the extendable deck 78 is fully extended (i.e., $\Delta l=l_{max}$) or if the extendable deck 78 is at a position between fully retracted and fully retracted (i.e., $0<\Delta l<l_{max}$). If the extendable deck 78 is fully retracted (i.e., $\Delta l$ is substantially equal to 0, step 1608 "NO"), process 1600 proceeds to step 1612. If the extendable deck 78 is at least partially extended (i.e., $\Delta l>0$, step 1608 "YES"), process 1600 proceeds to step 1610. Steps 1606 and 1608 may be performed by the controller 1500. Specifically, steps 1606 and 1608 may be performed by the object detection manager 1510 and/or the control signal generator 1514 of the controller 1500.

If the extendable deck 78 is at least partially extended (or fully extended), one or more operations of the lift assembly 14 and/or one or more operations of the lift device 10 are restricted (step 1610). Step 1610 can include restricting the extension and the retraction of the lift assembly 14 (such that the platform 16 does not move upwards or downwards while the extendable deck 78 is extended), and/or restricting the lift device 10 from being driven. Step 1610 may be performed by controller 1500. Specifically, step 1610 can be performed by the control signal generator 1514. Step 1610 can include restricting all operations of the lift assembly 14 and/or all operation of the lift device 10 until the extendable deck 78 is fully retracted. Process 1600 returns to step 1602 in response to performing step 1610. Steps 1604-1610 may be optional steps.

If the extendable deck 78 is not extended (step 1608, "NO"), process 1600 proceeds to determining sensor limits (step 1612). Determining the sensor limits (step 1612) may include determining an area of the stop zones 90 for each of the lidar sensors 114, an area of the warning zones 92 for each of the lidar sensors 114, and an area of the warning zones 93 for each of the lidar sensors 114. The sensor limits may be determined based on information received from the lift assembly sensor 115 that indicates a degree of extension of the lift assembly 14. For example, the longitudinal width 142*a* can be determined based on the distance 304 between the ground and the bottom of the platform 16. Step 1612 can be performed by the controller 1500. Specifically, step 1612 can be performed by the sensor limit manager 1508 of the controller 1500. Step 1612 may include determining (or retrieving) minimum allowable distances for each of the ultrasonic sensors 104 and/or warning ranges for each of the ultrasonic sensors 104.

Process 1600 includes receiving machine function information (step 1613), according to some embodiments. The machine function information can be a currently performed operation (e.g., a current driving operation such as forwards or rearwards motion, a current steering operation indicating a direction of travel of the lift device 10, a current operation of the lift assembly 14 such a raising or lowering the lift assembly 14, etc.). The machine function information can be used to determine which of the object detection information should be evaluated to detect the presence of obstacles surrounding the lift device 10. For example, if the machine function information indicates that the lift device 10 is driving forwards, the controller 1500 can evaluate the object detection information received from proximity sensors that face forwards (e.g., in a direction of travel of the lift device 10).

Process 1600 includes determining if an object is in any of the stop zones 90 or in any of the warning zones 92, or in any of the warning zones 93 (step 1614). Step 1616 can be performed based on the object detection information from any of the proximity sensors (e.g., the lidar sensors 114, the ultrasonic sensors 104) received in step 1602 and the sensor limits determined in step 1612 (e.g., the defined area of each of the stop zones 90, each of the warning zones 92, and each of the warning zones 93). Step 1614 can be performed by controller 1500. Specifically, step 1614 can be performed by object detection manager 1510. In some embodiments, step 1614 includes determining if an object is present in a stop zone or a warning zone based on the received object detection information and/or based on the machine function information. For example, if the lift assembly 14 is being raised, the controller 1500 may evaluate the object detection information received from proximity sensors that are above the lift device 10. Likewise, if the lift assembly 14 is being lowered, the controller 1500 may evaluate the object detection information received from proximity sensors that detect objects/obstacles below the lift device 10 (e.g., below the platform 16).

Process 1600 includes determining if an object is in any of the stop zones 90 (step 1616) or if an object is in any of the warning zones 92/93 (step 1618). Step 1616 can include determining if an object is at a transition between a stop zone 90 and an adjacent warning zone 92 or an adjacent warning zone 93. If an object is within one of the stop zones 90 or is at the transition between one of the stop zones 90 and the adjacent warning zones 93 or is at the transition between one of the stop zones and the adjacent warning zone 92 (step 1616 "YES"), process 1600 proceeds to step 1620. If an object is within one of the warning zones 92 or within one of the warning zones 93 (step 1618 "YES"), process 1600 proceeds to step 1622. Steps 1616 and 1618 may be performed concurrently. Steps 1616 and 1618 may be performed by the object detection manager 1510. Process 1600 proceeds to step 1626 in response to performing step 1618 (i.e., in response to "NO" for step 1618).

Process 1600 includes restricting one or more operations of the lift assembly 14 and/or one or more operations of the lift device 10 (step 1620) in response to determining that an object is in one of the stop zones 90 or at a transition between one of the stop zones 90 and an adjacent warning zone 92/93 (step 1616 "YES"). Step 1620 can include restricting the lift assembly 14 and/or the lift device 10 from moving in the direction of the detected object. However, the lift assembly 14 and/or the lift device 10 can still operate to move away from the detected object, according to some embodiments. Step 1620 can be performed by the control signal generator 1514 and the controllable elements 1518. Process 1600 proceeds to step 1622 in response to performing step 1620. Step 1622 and step 1620 may be performed concurrently with each other.

Process 1600 includes providing an alert to a user (step 1622) in response to determining that an object is present in one of the stop zones 90 (step 1616, "YES") or in response to determining that an object is present in any of the warning zones 92/93 (step 1618, "YES"). The alert provided to the user may be any of a visual alert, an aural alert, or a combination of both. The alert may be provided to the user via the alert system 1516. More specifically, the visual alert may be provided to the user via visual alert device(s) 1522, and the aural alert can be provided to the user via aural alert device(s) 1524. The type of visual and/or the type of aural alert can be provided based on a distance between the detected object and any of the lift assembly 14, the platform 16, and the frame assembly 12. For example, if an object is detected at the transition between one of the stop zones 90 and an adjacent one of the warning zones 92/93, the alert provided to the user may be both a visual and an aural alert. In another example, if an object is detected within one of the warning zones 92/93 but is not at the transition between the stop zone 90 and the adjacent warning zones 92/93, the alert provided to the user may be only a visual alert or only an aural alert. Process 1600 proceeds to step 1626 in response to performing step 1622.

Process 1600 can be repeated (step 1626) over an entire duration of the operation of the lift device 10. Any of steps 1602-1626 may be performed concurrently with each other. Process 1600 can be performed in real-time to provide real time alerts to the user during operation of the lift device 10.

Configuration of Exemplary Embodiments

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A lift device, comprising:
a chassis;
a plurality of tractive elements rotatably coupled to the chassis and configured to support the chassis;
a platform disposed above the chassis, the platform including a deck extending in a substantially horizontal plane and defining a top surface configured define a surface for an operator to stand, the platform including a plurality of rails extending upwards from the deck;
a lift assembly coupling the platform to the chassis and configured to selectably move the platform between a lowered position and a raised position above the lowered position;
a plurality of distance sensors coupled to the platform, the plurality of distance sensors comprising:
a first distance sensor coupled on the deck at a bottom of the platform at a first distal end oriented in a downwards direction;
a second distance sensor coupled on the deck at the bottom of the platform at a second distal end oriented the downwards direction;
a third distance sensor positioned on a first vertical rail of the platform at a corner between a first lateral side of the platform and the first distal end of the platform, the third distance sensor oriented partially downwards and partially towards the second distal end of the platform; and
a fourth distance sensor positioned on a second vertical rail of the platform at a corner between a second lateral side of the platform and the second distal end of the platform, the fourth distance sensor oriented partially downwards and partially towards the first distal end of the platform;
wherein the first distal end is opposite the second distal end.

2. The lift device of claim 1, further comprising a controller operably coupled with an alert system and configured to receive obstacle detection data from the plurality of distance sensors, wherein the controller is configured to provide an alert indication to the alert system in response to determining that an obstacle is within a minimum allowable distance from the lift device, wherein the controller is configured to (a) select a subset of the plurality of distance sensors to analyze based on an active function of the lift device and (b) determine whether the obstacle is within the minimum allowable distance from the lift device based on the obstacle detection data from the subset of the plurality of distance sensors.

3. The lift device of claim 1, wherein the fourth distance sensor is configured to monitor an amount of extension or retraction of an extendable deck that is configured to extend from the first distal end of the platform.

4. The lift device of claim 1, wherein a controller is configured to define a stop zone and a warning zone based on obstacle detection data received from the plurality of distance sensors.

5. The lift device of claim 4, wherein the controller is configured to restrict an operation of the lift device in response to determining that an obstacle is present in the stop zone and the warning zone.

6. The lift device of claim 5, wherein the controller is configured to:
restrict a forwards driving operation of the lift device in response to determining that the obstacle is present in a stop zone in front of the lift device;
restrict a rearwards driving operation of the lift device in response to determining that the obstacle is present in a stop zone rearwards of the lift device; and
restrict an extension operation of the lift assembly in response to determining that the obstacle is present within or at a predetermined distance above the platform.

7. The lift device of claim 4, wherein, in response to determining that an obstacle is present in at least one of the stop zone and the warning zone, the controller operates at least one of an alert light or an alert speaker of an alert system such that the alert light emits a light as a visual alert or the alert speaker produces a sound as an aural alert.

8. The lift device of claim 7, wherein in response to detecting that the obstacle is present in a warning zone in front of the lift device, the controller activates at least one of an aural alert device at a front end of the lift device such that the aural alert device at the front end of the lift device produces a sound at the front end of the lift device as the aural alert or the controller activates a visual alert device at the front end of the lift device such that the visual alert device at the front end of the lift device emits a light at the front end of the lift device as the visual alert, wherein in response to detecting that the obstacle is present in a warning zone rearwards of the lift device, the controller activates at least one of an aural alert device at a rear end of the lift device such that the aural alert device at the rear end of the lift device produces a sound at the rear end of the lift device as the aural alert or the controller activates a visual alert device at the rear end of the lift device such that the visual alert device emits a light at the rear end of the lift device as the visual alert.

9. The lift device of claim 4, further comprising a plurality of ultrasonic sensors coupled to the platform, wherein the plurality of ultrasonic sensors are configured to detect a distance of an obstacle relative to a portion of the platform and provide obstacle detection data, wherein the controller is configured to increase a size of the stop zone or the warning zone based on an extension of the lift assembly.

10. A method for providing an alert for a lift device and restricting operation of the lift device, the method comprising:
receiving object detection data from one or more proximity sensors, the one or more proximity sensors comprising a first distance sensor positioned on a deck of the lift device at a bottom of a platform of the lift device on a first end of the deck, the first distance sensor oriented in a downwards direction, and a second distance sensor positioned on the deck of the lift device at the bottom of the platform of the lift device on a second end of the deck, the second distance sensor oriented in the downwards direction, a third distance sensor positioned on a vertical rail of the platform at a corner between a first lateral side of the platform and a first distal end of the platform, the third distance sensor oriented partially downwards and partially towards a second distal end of the platform, and a fourth distance sensor positioned on a second vertical rail of the platform at a corner between a second lateral side of the platform and the second distal end of the platform, the fourth distance sensor oriented partially downwards and partially towards the first distal end of the platform;
determining a plurality of sensor limit values based on machine function information of the lift device;

determining if an obstacle is present in a stop zone or a warning zone using the received object detection data;

restricting one or more operations of a lift assembly of the lift device and the lift device in response to determining that the obstacle is present in the stop zone;

in response to determining that the obstacle is present in the warning zone, operating at least one of an alert light or an alert speaker such that the alert light emits a light as a visual alert or the alert speaker produces a sound as an aural alert; and wherein the first end of the deck is the first distal end and the second end of the deck is the second distal end opposite to the first distal end.

11. The method of claim 10, wherein the one or more proximity sensors comprise a first plurality of proximity sensors and a second plurality of proximity sensors, wherein the first plurality of proximity sensors are coupled with the platform of the lift device and are oriented in the downwards direction, wherein the second plurality of proximity sensors are coupled with the platform of the lift device and are oriented along a longitudinal axis of the platform or in a direction at least partially upwards, wherein the first plurality of proximity sensors are the first, second, third, and fourth distance sensors.

12. The method of claim 10, wherein determining the plurality of sensor limit values comprises determining a first and second sensor limit value that define the stop zone and the warning zone for a corresponding one of the one or more proximity sensors.

13. The method of claim 10, wherein the stop zone is an area below the platform of the lift device, and the warning zone is areas adjacent the stop zone.

14. An obstacle detection system for a lift device, the obstacle detection system comprising:

a first proximity sensor at a first end of a deck at a bottom of a platform and oriented in a downwards direction;

a second proximity sensor at a second end of the deck at the bottom of the platform and oriented in the downwards direction;

a third proximity sensor positioned on a first vertical rail of the platform at a corner between a first lateral side of the platform and a first distal end of the platform, the third proximity sensor oriented partially downwards and partially towards a second distal end of the platform; and a fourth proximity sensor positioned on a second vertical rail of the platform at a corner between a second lateral side of the platform and the second distal end of the platform, the fourth proximity sensor oriented partially downwards and partially towards the first distal end of the platform; and a controller operably coupled with an alert system, wherein the controller is configured to:

receive obstacle detection data from the first proximity sensor, the second proximity sensor, the third proximity sensor, and the fourth proximity sensor;

determine a position of an obstacle relative to the lift device;

determine if the obstacle is within a warning zone or a stop zone;

in response to determining that the obstacle is within the warning zone, operate at least one of an alert light such that the alert light emits a light as a visual alert or an alert speaker such that the alert speaker produces a sound as an aural alert;

in response to determining that the obstacle is within the stop zone, restrict one or more operations of the lift device.

15. The obstacle detection system of claim 14, wherein the controller is configured to determine if an extendable deck of the platform is extended or retracted based on the obstacle detection data received from at least one of the first proximity sensor, the second proximity sensor, the third proximity sensor, or the fourth proximity sensor.

16. The obstacle detection system of claim 15, wherein the controller is configured to restrict one or more lift or driving operations of the lift device in response to determining that the extendable deck of the platform is extended.

17. The obstacle detection system of claim 14, wherein the controller is configured to adjust the stop zone and the warning zone based on the obstacle detection data or a degree of extension of a lift assembly of the lift device.

18. The obstacle detection system of claim 14, wherein the first proximity sensor, the second proximity sensor, the third proximity sensor, and the fourth proximity sensor are distance sensors.

19. The obstacle detection system of claim 14, wherein the first proximity sensor, the second proximity sensor, the third proximity sensor, and the fourth proximity sensor are configured to detect obstacles or objects at least partially below the platform, the obstacle detection system further comprising another plurality of proximity sensors configured to detect obstacles or objects above the platform.

20. The obstacle detection system of claim 19, wherein the other plurality of proximity sensors are ultrasonic sensors.

* * * * *